(12) United States Patent
Matsumoto et al.

(10) Patent No.: US 8,553,880 B2
(45) Date of Patent: Oct. 8, 2013

(54) PSEUDORANDOM NUMBER GENERATING SYSTEM, ENCRYPTION SYSTEM, AND DECRYPTION SYSTEM

(75) Inventors: Makoto Matsumoto, Hiroshima (JP); Takuji Nishimura, Yamagata (JP); Mutsuo Saito, Hiroshima (JP); Mariko Hagita, Tokyo (JP)

(73) Assignees: Ochanomizu University, Tokyo (JP); Hiroshima University, Hiroshima (JP)

( * ) Notice: Subject to any disclaimer, the term of this patent is extended or adjusted under 35 U.S.C. 154(b) by 832 days.

(21) Appl. No.: 11/920,276

(22) PCT Filed: May 12, 2006

(86) PCT No.: PCT/JP2006/309537
§ 371 (c)(1),
(2), (4) Date: May 18, 2009

(87) PCT Pub. No.: WO2006/121149
PCT Pub. Date: Nov. 16, 2006

(65) Prior Publication Data
US 2009/0296928 A1    Dec. 3, 2009

(30) Foreign Application Priority Data
May 13, 2005 (JP) ................................. 2005-141725

(51) Int. Cl.
*H04L 9/00* (2006.01)
(52) U.S. Cl.
USPC ............... 380/46; 380/28; 380/255; 380/259; 380/36; 380/37; 380/42; 380/47; 713/150; 713/168; 708/100; 708/200; 708/250; 708/251; 708/252; 708/253; 708/254; 708/255
(58) Field of Classification Search
USPC .......................................................... 380/46
See application file for complete search history.

(56) References Cited

U.S. PATENT DOCUMENTS 4,366,549 A * 12/1982 Katayama ..................... 708/625
4,667,301 A *  5/1987 Chiu et al. .................... 708/250

(Continued)

FOREIGN PATENT DOCUMENTS

JP    04-170576 A    6/1992
JP    10-153954 A    6/1998

(Continued)

OTHER PUBLICATIONS

Makoto Matsumoto and Takuji Nishimura, "Mersenne Twister: A 623-Dimensionally Equidistributed Uniform Pseudo-Random Number Generator", ACM, vol. 8, Jan. 1998, pp. 3-30.*

(Continued)

*Primary Examiner* — Edan Orgad
*Assistant Examiner* — Canh Le
(74) *Attorney, Agent, or Firm* — Rader, Fishman & Grauer PLLC

(57) ABSTRACT

The pseudorandom number generating system repeatedly performs simple transformation of a non-secure pseudorandom number sequence that may be generated quickly, and thus may quickly generate a highly secure pseudorandom number sequence having a long period. Furthermore, the encryption system and the decryption system do not generate a large encryption function difficult to be deciphered based on a shared key 122, but prepare multiple functions 126, which perform fast, different types of transformation, and select a combination of functions determined based on information of the shared key 122, and make the selected functions transform a text multiple times, thereby encrypt the text. Each of the functions is fast, and thus transformation by the entire combination is also fast. Furthermore, since the combination of functions and repetitive count can be changed, future improvement in specification is easy. Moreover, security is high since which functions are applied in what order is unknown.

6 Claims, 8 Drawing Sheets

(56) References Cited

U.S. PATENT DOCUMENTS

| | | | |
|---|---|---|---|
| 5,222,139 A | 6/1993 | Takaragi et al. | |
| 6,141,668 A * | 10/2000 | Shimada | 708/250 |
| 6,285,761 B1 * | 9/2001 | Patel et al. | 380/44 |
| 7,085,791 B2 * | 8/2006 | Barry et al. | 708/250 |
| 7,379,955 B1 * | 5/2008 | Kuehnel et al. | 708/250 |
| 2002/0184273 A1 * | 12/2002 | Katsunori | 708/250 |
| 2003/0053627 A1 | 3/2003 | Iizuka | |
| 2005/0041811 A1 * | 2/2005 | Kobayashi et al. | 380/255 |

FOREIGN PATENT DOCUMENTS

| | | |
|---|---|---|
| JP | 11-015940 A | 1/1999 |
| JP | 11-024558 A | 1/1999 |
| JP | 11-500849 A | 1/1999 |
| JP | 11-149367 A | 6/1999 |
| JP | 11-265146 A | 9/1999 |
| JP | 2002-016595 A | 1/2002 |
| JP | 2003-037482 A | 2/2003 |
| JP | 2003-084668 A | 3/2003 |
| JP | 2004-038020 A | 2/2004 |
| JP | 2004-158899 A | 6/2004 |
| WO | WO97/20266 A | 6/1997 |
| WO | WO-01/50676 A2 | 7/2001 |

OTHER PUBLICATIONS

Makoto Matsumoto, Mutsuo Saito, Takuji Nishimura, and Mario Hagita, "CrypTMT stream cipher version 3", Jun. 29, 2006, pp. 1-14.*

Office Action issued in Japanese Patent Application No. 2011-061811, dated Jan. 9, 2013.

Blum, M. et al. "A Simple Unpredictable Pseudo-Random Number Generator," Siam J. Comput. vol. 15, No. 2, May 1986, pp. 364-383.

"Pseudo-Random-Sequence Generators and Stream Ciphers" John Wiley & Sons, Inc., 1996, pp. 369-428.

Matsumoto M. et al., "Mersenne Twister: A 623-dimensionally equidistributed uniform pseudorandom number generator," ACM Trans. on Modeling and Computer Simulation vol. 8, No. 1, Jan. 1998, pp. 3-30.

Office Action in Japanese patent application No. 2005-141725, dated Jan. 18, 2011.

Hideki Takayasu et al., "Stable Infinite Variance Fluctuations in Randomly Amplified Langevin Systems", Physical Review Letters, vol. 79, No. 6, pp. 966-969, Aug. 11, 1997.

International Search Report mailed on Aug. 29, 2006.

* cited by examiner

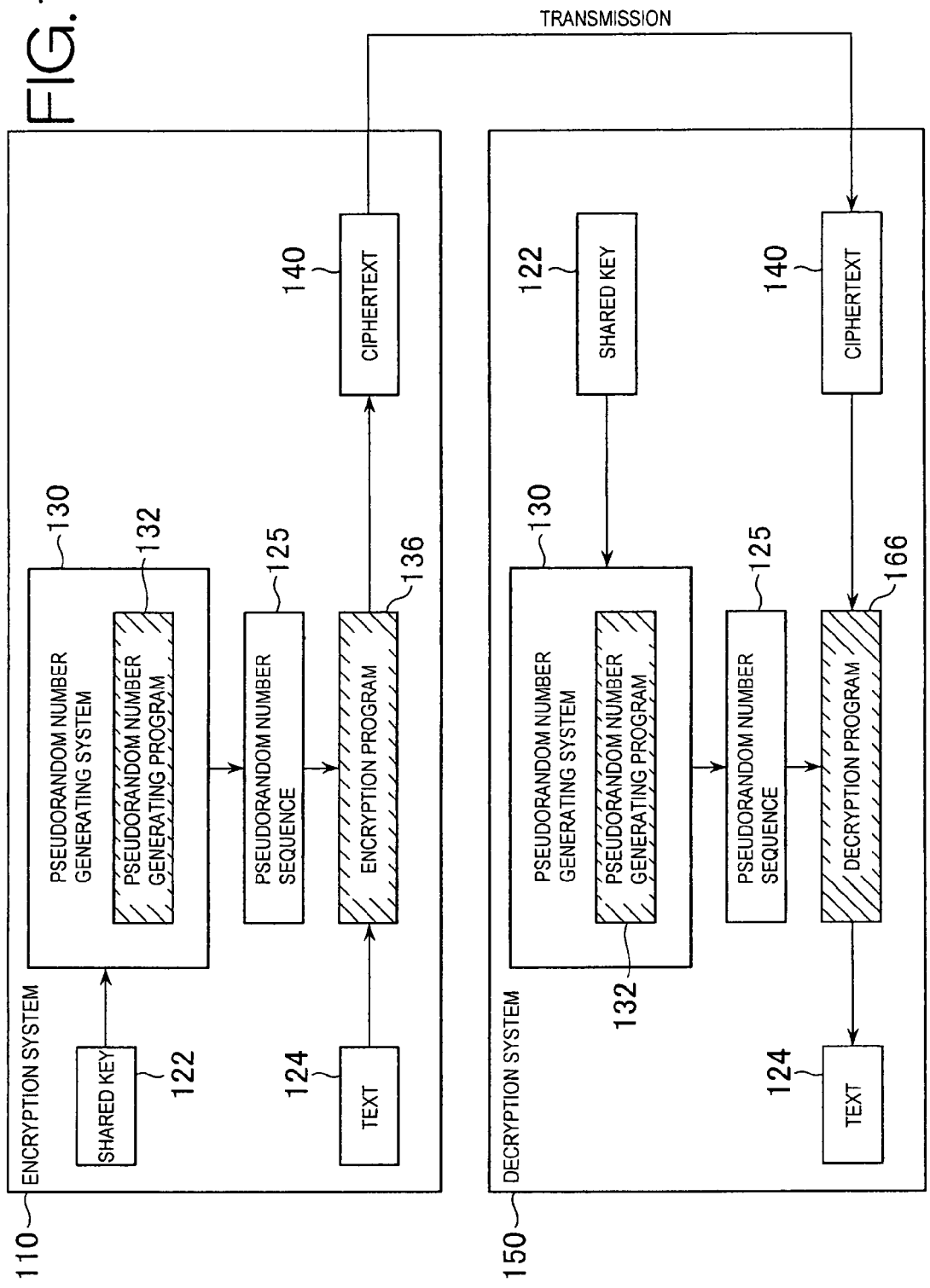

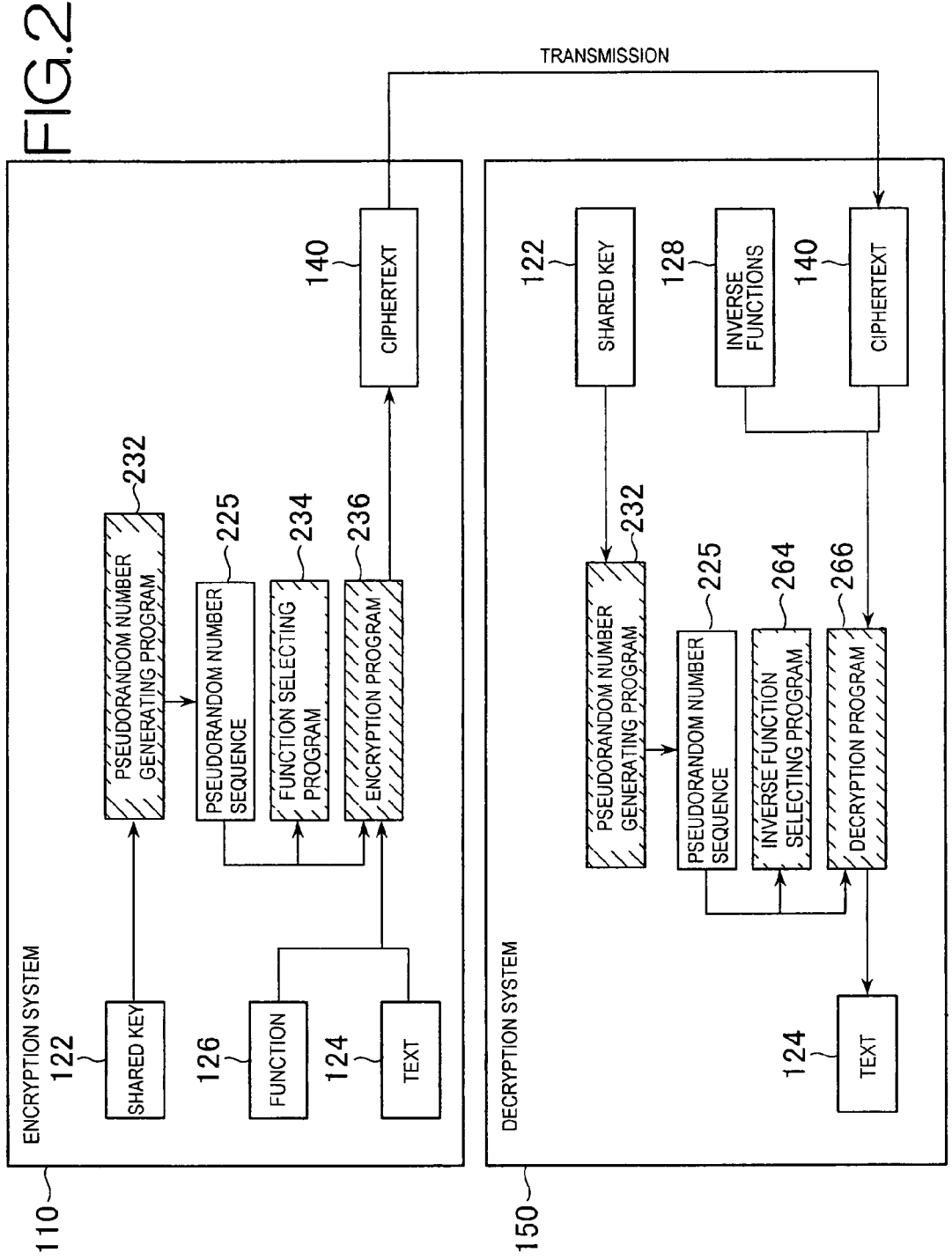

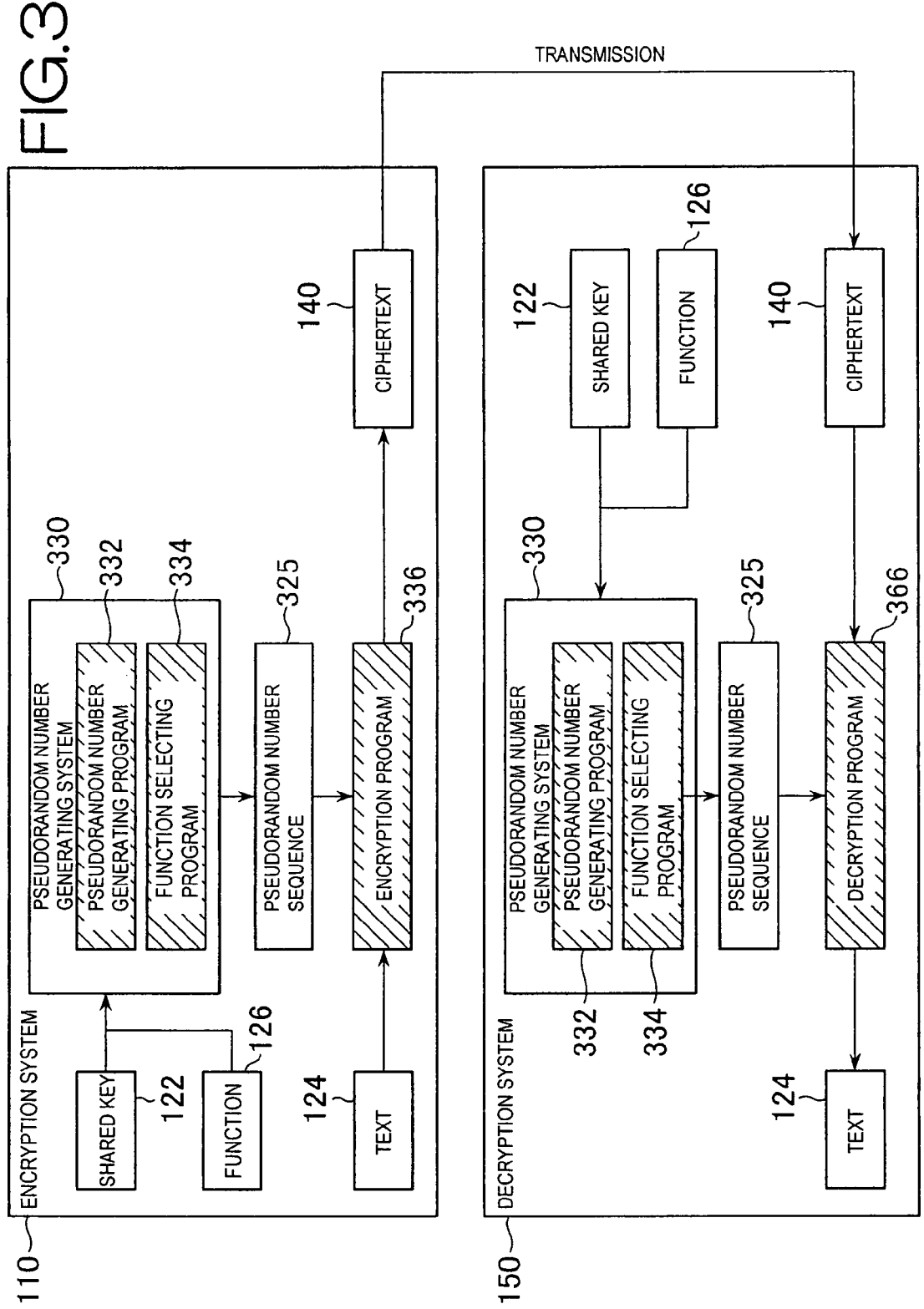

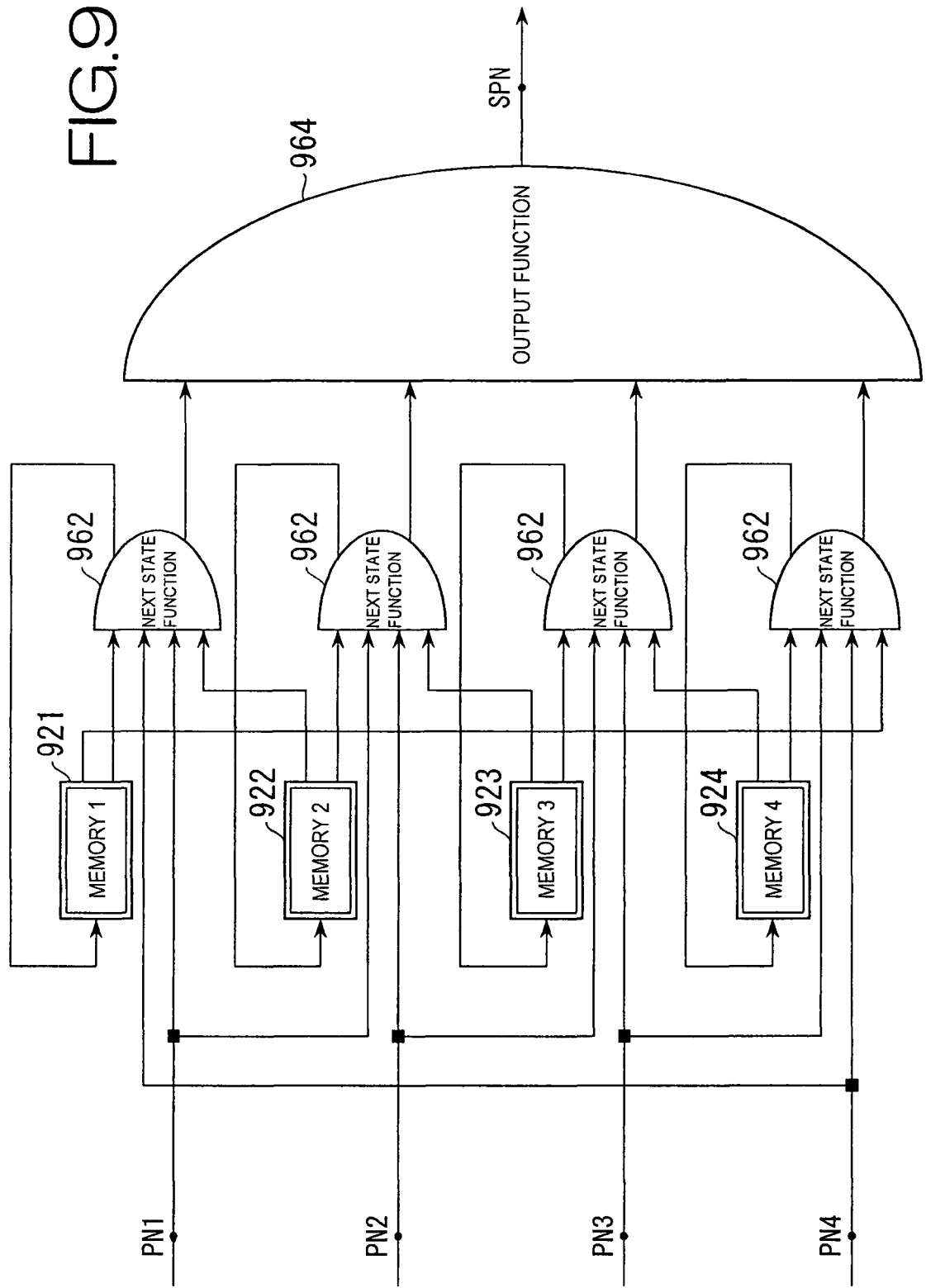

US 8,553,880 B2

PSEUDORANDOM NUMBER GENERATING SYSTEM, ENCRYPTION SYSTEM, AND DECRYPTION SYSTEM

TECHNICAL FIELD

The present invention relates to a pseudorandom number generating system for a block cipher and a stream cipher using a shared key, an encryption system, and a decryption system.

BACKGROUND ART

When storing text that should not be seen by a third party as electronic data, the data is encrypted and transformed such that it cannot be decrypted without knowing a password. An encryption method called a block cipher of segmenting data into fixed sized blocks and encrypting the respective blocks using a specified function dependant on a secret key, and a decryption method called a stream cipher of encrypting using different functions according to position of data are currently widely used as the cryptographic technology. With the stream cipher, data and a cryptographic random number sequence are often exclusive-ORed.

Even when using electronic commerce over the Internet, data is encrypted and then transmitted in order to securely conduct communication between two points A and B without being known by a third party. A shared key encryption method represented by DES, Triple DES, or AES is currently widely used as the cryptographic technology for such transmission. This is a method for transforming data to be transmitted, into data a third party cannot interpret based on a shared encryption key shared only by A and B between which communication is conducted.

DES (Data Encryption Standard) is a shared key encryption method recommended as a standard for data encryption by the US National Institute of Standards and Technology (NIST). Triple DES is an encryption method increasing security by repeating DES three times. AES (Advanced Encryption Standard) is an encryption method called Rijindael developed by mathematicians J. Daemen and V. Rijimen and publicly offered by NIST as a standard for data encryption instead of DES. All of these methods are shared key encryption methods or block ciphers encrypting segmented, fixed size blocks of data at a high speed using a shared key. Computation amount required for this conversion is extremely small, and thus very practical.

For the stream cipher, a method of generating a cryptographic random number sequence through Blum-Blum-Shub (BBS), which generates pseudorandom numbers using quadratic residuosity, and taking exclusive-OR with the text to obtain a cipher text is widely known. BBS repeats squaring an encryption key k and conducting modulo operation: the resulting squared number mod N, thereby providing respective residues, where N is a product of two secret prime numbers, and then arranges the least significant bits thereof to make a cryptographic random number sequence. 'L. Blum, M. Blum, M. Shub: "A Simple Unpredictable Pseudo-Random Number Generator", SIAM J. Comput. Vol 15, No. 2, May 1986' shows that the resulting cryptographic random number sequence is extremely cryptographically excellent as long as N is sufficiently large, in other words, the resulting pseudorandom number sequence has a property that predicting the next bit at a better probability than by random is difficult even if it is made from collected, multiple successive pieces of data. Therefore, it is considered that use of this causes it extremely difficult to find a rule even if many letters are estimated, and computations equal to complete checking is required to estimate other substrings.

However, since the block cipher according to the conventional shared key encryption method creates a complicated encryption function based on key information and then transforms plaintext using the created function, a problem that a fast cryptosystem creates one-sided functions and thus information for deciphering is easily obtained develops. For example, when trying to decipher a code, attacking through encryption of a well-known plaintext using differential cryptanalysis, linear cryptanalysis or the like is often used. In other words, there is a problem that in a situation where an attacker is capable of encrypting an arbitrary text, data used for encryption is collected and thus the code is broken more easily than by searching all keys. Furthermore, even with the shared key encryption method stream ciphers, as it is slow to compute the square of a large number and residue for that value or a large number N through the aforementioned BBS, for example, there is a problem that computation for generating a sufficiently secure cryptographic random number sequence is extremely slow, and a pseudorandom number quickly generated is not cryptographically secure.

Moreover, there is a problem that a currently well-known cryptographic random number sequence for a stream cipher has a short period and therefore cannot be used for a long time.

Methods for coping with these problems are given in Patent Documents 1 through 5, for example. In Patent Document 1 and Patent Document 2, preparing multiple encryption functions, selecting one of the encryption functions based upon key data or data from the outside, and encrypting using that selected one that is different for each plaintext allows prevention of leakage of information and allows authentication. In Patent Documents 3 through 5, how to create a cryptographic random number sequence with excellent properties is provided. Particularly in Patent Document 3, a cryptographic random number sequence is generated after having rewritten a plaintext sequence through finite-state automaton, which is strongly tied to the present invention. Although it is a pseudorandom number generator based on a linear feedback shift register (LFSR), there is a problem that processing speed when software is implemented is insufficient. Furthermore, conventional technology regarding the pseudorandom number generator based on LFSR is disclosed in 'B. Schneier, "Applied Cryptography," John Wiley & Sons, Inc., 1996. pp. 369-428'.

Patent Document 1: Japanese Unexamined Patent Application Publication No. Hei 11-15940
Patent Document 2: Japanese Unexamined Patent Application Publication No. Hei 11-265146
Patent Document 3: Japanese Unexamined Patent Application Publication No. Hei 11-500849
Patent Document 4: Japanese Unexamined Patent Application Publication No. 2003-37482
Patent Document 5: Japanese Unexamined Patent Application Publication No. 2004-38020

DISCLOSURE OF THE INVENTION

Problems to be Solved by the Invention

However, the most possible number of encryption functions must be prepared in order to achieve sufficient effects using the aforementioned Patent Reference 1 and Patent Reference 2, and this develops a problem that larger memory capacity several times that number for storing those encryption functions and more computations for creating those encryption functions are necessary.

In addition, even if a cryptographic random number sequence is generated using the methods of Patent Documents 3 through 5, the period thereof cannot be long enough and this develops a problem with speed and security.

An objective of the present invention is to increase security without increasing computation amount and resolve these problems.

Means of Solving the Problems

In order to resolve the above-given problem, the present invention is a pseudorandom number generating system, which outputs a cryptographically secure pseudorandom number sequence generated from a sequence of numbers prepared ahead of time. The pseudorandom number generating system is characterized in that it includes: a storage means, which is stored with predetermined number of bits (words) to which an initial value is preset; a pseudorandom number generating means, which generates a pseudorandom number sequence based on the sequence of numbers; and a secure pseudorandom number generating means, which generates a secure pseudorandom number sequence based on the pseudorandom number sequence. The secure pseudorandom number generating means cuts out a word from the pseudorandom number sequence and sets the least significant bit of the word to 1, stores in the storage means the value resulting from multiplying value stored in the storage means by the cut out word in conformity with modulo 2 to the power of a word length, and outputs a part or all of a bit sequence resulting from repeated multiplication as the secure pseudorandom number sequence.

In the pseudorandom number generating means, the secure pseudorandom number generating means may output a predetermined number of bits, which have resulted from said multiplication, in order beginning from the most significant bit thereof as the secure pseudorandom number sequence.

Alternatively, the present invention is a pseudorandom number generating system, which outputs a cryptographically secure pseudorandom number sequence generated based on a sequence of numbers prepared ahead of time. The pseudorandom number generating system is characterized in that it includes: a function executing means, which executes a plurality of types of functions for each word of a predetermined number of bits; a pseudorandom number generating means, which generates a pseudorandom number sequence based on the sequence of numbers; and a function selecting means, which selects one or more of the functions executed by the function executing means, while allowing the selected functions to include the same types of functions. The function selecting means selects a function using the pseudorandom number sequence for each word of the generated pseudorandom number sequence, and the function executing means uses the word of the pseudorandom number sequence as a parameter for the selected function to transform the pseudorandom number sequence, and generates the secure pseudorandom number sequence.

In the pseudorandom number generating system, the pseudorandom number generating means may generate pseudorandom numbers using a linear next state function.

Furthermore, the function selecting means and the function executing means may repeat selection and transformation for each word a predetermined number of times to transform the word into the secure pseudorandom number sequence.

Moreover, a storage means, which is stored with predetermined number of bits (words) to which an initial value is preset, is further provided. The secure pseudorandom number generating means may generate a pseudorandom number sequence from the sequence of numbers, cut out a word from the generated pseudorandom number sequence, and set the least significant bit of the word to 1, store in the storage means the value resulting from multiplying value stored in the storage means by the cut out word in conformity with modulo 2 to the power of a word length, and make a part or all of a bit sequence resulting from repeated multiplication be the secure pseudorandom number sequence.

Further, the present invention is an encryption system, which encrypts a text based on a predetermined shared key. The encryption system is characterized in that it includes: a text storage means, which is stored with the text; a function executing means, which executes a plurality of types of functions; an expanded key generating means, which generates an expanded key based on the shared key; and a function selecting means, which selects one or more of the functions executed by the function executing means, while allowing the selected functions to include the same type of functions using the expanded key. The function executing means determines parameters for the respective selected functions using bit data of the expanded key, and makes the selected functions transform and encrypt the text from the text storage means in a predetermined block size.

Yet further, the present invention is a decryption system, which decrypts a ciphertext based on a predetermined shared key. The decryption system is characterized in that it includes: a ciphertext storage means, which is stored with the ciphertext; an inverse function executing means, which executes a plurality of types of inverse functions corresponding to a plurality of types of functions used for encryption; an expanded key generating means, which generates an expanded key based on the shared key; and an inverse function selecting means, which selects one or more of the functions executed by the function executing means, while allowing the selected functions to include the same type of functions using the expanded key. The inverse function executing means determines parameters for the respective selected inverse functions using bit data of the expanded key, and makes the inverse functions transform and encrypt the ciphertext from the ciphertext storage means in a predetermined block size.

Yet further, the present invention is an encryption system, which encrypts a text based on a predetermined shared key. The encryption system is characterized in that it includes: a text storage means, which is stored with the text; a function executing means, which executes a plurality of types of functions for each block of a predetermined number of bits where a predetermined number of bits comprise a word; a pseudorandom number generating means, which generates a pseudorandom number sequence based on the shared key; and a function selecting means, which selects one or more of the functions executed by the function executing means, while allowing the selected functions to include the same type of functions. The function selecting means successively selects a function based on the pseudorandom number sequence for each block of the text from the text storage means, and the function executing means makes the selected functions transform and encrypt the text by using the block of the pseudorandom number sequence as a parameter.

Yet further, the present invention is a decryption system, which decrypts a ciphertext based on a predetermined shared key. The decryption system is characterized in that it includes: a ciphertext storage means, which is stored with the ciphertext; an inverse function executing means, which executes a plurality of types of inverse functions corresponding to a plurality of types of functions used for encryption for each block of a predetermined number of bits where a predetermined number of bits comprise a word; a pseudorandom number generating means, which generates a pseudorandom number sequence based on the shared key; and an inverse function selecting means, which selects one or more of the functions executed by the function executing means, while allowing the selected functions to include the same type of functions. The inverse function selecting means successively selects an inverse function based on the pseudorandom number sequence for each block of the ciphertext from the ciphertext storage means, and the inverse function executing means makes the selected inverse functions transform and decrypt the ciphertext using the block of the pseudorandom number sequence as a parameter.

In the encryption system, the expanded key generating means and the pseudorandom number generating means may generate pseudorandom numbers using a linear next state function.

Furthermore, the function selecting means and the function executing means may repeat selection and transformation for each block a predetermined number of times to encrypt the text.

Moreover, a storage means, which is stored with predetermined number of bits (words) to which an initial value is preset, is further provided. The pseudorandom number generating means may generate a pseudorandom number sequence from the sequence of numbers, cut out a word from the generated pseudorandom number sequence, and set the least significant bit of the word to 1, and make a part or all of a bit sequence resulting from repeated multiplication of the cut out word from the storage means be the secure pseudorandom number sequence in conformity with modulo 2 to the power of a word length.

Further, the function executing means, which includes an inter-word function for a plurality of words, may make the inter-word function change intervals of the plurality of words each time of encrypting a text.

In the decryption system, the expanded key generating means and the pseudorandom number generating means may generate pseudorandom numbers using a linear next state function.

Further, the inverse function selecting means and the inverse function executing means may repeat selection and transformation for each block a predetermined number of times to decrypt the ciphertext.

Moreover, a storage means, which is stored with predetermined number of bits (words) to which an initial value is preset, is further provided. The pseudorandom number generating means may generate a pseudorandom number sequence from the sequence of numbers, cut out a word from the generated pseudorandom number sequence, and set the least significant bit of the word to 1, and make a part or all of a bit sequence resulting from repeated multiplication of the cut out word from the storage means be the secure pseudorandom number sequence in conformity with modulo 2 to the power of a word length.

Further, the inverse function executing means, which includes an inter-word inverse function for a plurality of words, may make the inter-word inverse function change intervals of the plurality of words each time of decrypting a ciphertext.

Yet further, the above-given pseudorandom number generating system further provides the storage means in plural. The secure pseudorandom number generating means is characterized in that it cuts out the same number of words as the number of the storage means from the pseudorandom number sequence, multiplies the values stored in respective storage means by corresponding respective cut out words in parallel, and outputs the secure pseudorandom number sequence.

Moreover, the secure pseudorandom number generating means may be characterized in that it performs another operation than multiplication of the values stored in the storage means by corresponding respective cut out words using values of another storage means for the operation.

A program establishing in a computer system a function of any of the above given pseudorandom number generating system, encryption system, and decryption system is also the present invention.

Results Of Invention

The present invention provides an encryption system and a decryption system, which implement a fast and highly secure block cipher and stream cipher using information of a shared key for selecting a function as well as generating an encryption function, and a pseudorandom number generating system, which generates a highly secure cryptographic random number sequence having a long period by rewriting a cryptographically non-secure pseudorandom number sequence through simple transformation.

A pseudorandom number generating system of a first embodiment according to the present invention generates a sufficiently secure cryptographic random number sequence, and repeatedly performs the aforementioned transformation using a large quantity of non-secure pseudorandom number sequences that may be generated quickly. Thus, highly secure and fast encryption may be implemented. Furthermore, use of a cryptographic random number generating method of rewriting a cryptographically non-secure pseudorandom number sequence through simple transformation allows implementation of a highly secure cryptographic random number where, for example, a period being $2^{19937}-1$ is secured. This period is extremely longer than any conventionally known encrypted random number sequence, and may be securely used over a long time.

Furthermore, a pseudorandom number generating system, a encryption system and a decryption system according to second through fifth embodiments of the present invention do not generate a large encryption function difficult to be deciphered based on key information, but prepare multiple functions, which perform fast, different types of transformation, select a combination of functions determined based on the key information, and make the selected functions transform a text multiple times, thereby encrypt the text Each of the transformations is basically fast, and thus transformation by the entire combination is also extremely fast. Furthermore, since the combination functions and repetitive count for them can be changed, future improvement in specification is easy. Security is high since which functions from a family of functions are applied in what order is unknown. Therefore, a system difficult to be deciphered that has different types of functions to be used based on a key may be implemented without placing too much burden such that a plurality of complicated encryption functions are prepared as in the conventional Patent Document 1 and Patent Document 2.

Furthermore, as shown in a sixth embodiment, a system that is more difficult to be deciphered may be implemented by adding a method of the second through fifth embodiments.

As such, according to the present invention, cryptographic security may be heightened more than with the conventional method.

BRIEF DESCRIPTION OF DRAWINGS

FIG. 1 is a diagram showing an exemplary system configuration of performing encryption and decryption of text using a pseudorandom number generating system of a first embodiment according to the present invention;

FIG. 2 is a diagram showing exemplary configurations of an encryption system and a decryption system of a second, a third, and a fifth embodiment according to the present invention;

FIG. 3 is a diagram showing an exemplary system configuration of performing encryption and decryption of text using a pseudorandom number generating system of a fourth embodiment according to the present invention;

FIG. 4(a) is a diagram showing processing flow for a conventional stream cipher while

FIG. 9 is a diagram showing processing flow for Application 2 using four memories in the pseudorandom number generating system of the first embodiment.

BEST MODE FOR CARRYING OUT THE INVENTION

Figure 4A:
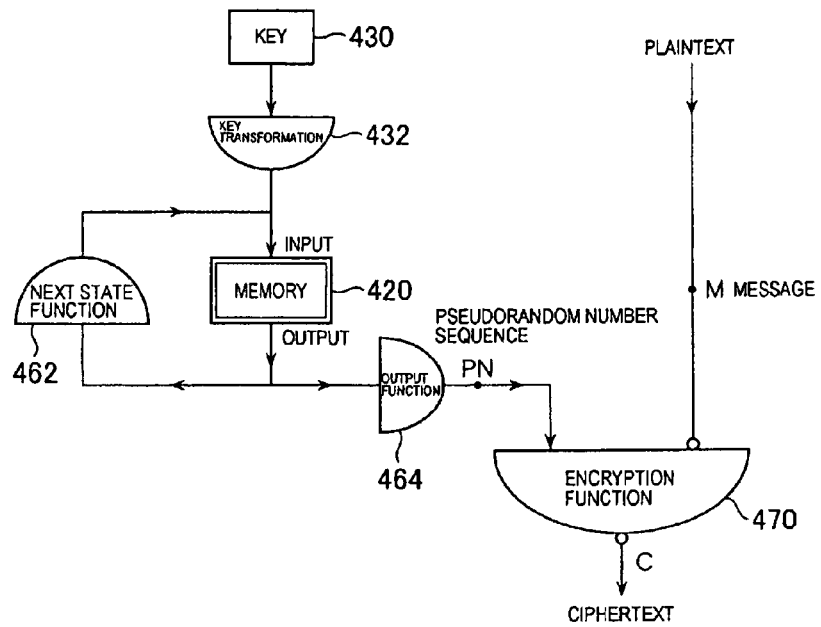

Specific examples are given forthwith to describe embodiments of the pseudorandom number generating system, the encryption system, and the decryption system according to the present invention. First and fourth embodiments are examples of cases where a pseudorandom number generating system is used for encryption and decryption of text. Second, third, and fifth embodiments are embodiments of the encryption system and the decryption system.

Note that terms used forthwith are defined as given below.
Word: 1 word is constituted by 32 bits in these embodiments.
Block: Unit block in which encryption is performed for every n-words (e.g., 1 block is constituted by 4 words).
First Embodiment: A pseudorandom number generating system, which successively takes product of a word in a cryptographically non-secure pseudorandom number sequence generated from a pre-prepared sequence of numbers and a word stored in single word memory, stores result thereof in the single word memory, and generates a secure cryptographic random number sequence from the most significant bit and subsequent bits thereof. By using a shared key for the sequence of numbers, the generated cryptographic random number sequence may be used for encryption and decryption of text by a stream cipher.
Second Embodiment: A fundamental example of an encryption system and a decryption system (block cipher), which is characterized in that it transforms block by block a text, which is divided into blocks, using a function selected for each block based on a pseudorandom number sequence (expanded key), which is generated according to a shared key, thereby generating a ciphertext.
Third Embodiment: An encryption system and a decryption system (stream cipher), which is characterized in that it transforms block by block a text, which is divided into blocks, using a function selected for each block based on a pseudorandom number sequence, which is generated according to a shared key, thereby generating a ciphertext.
Fourth Embodiment: A pseudorandom number generating system, which is characterized in that it transforms a block of a pseudorandom number sequence generated from a pre-prepared sequence of numbers using a function selected based on the pseudorandom number sequence, and thereby generating a secure cryptographic random number sequence. Use of a shared key for the sequence of numbers allows use of the generated cryptographic random number sequence for encryption and decryption of text by a stream cipher.
Fifth Embodiment: Proposes a method of performing encryption further effectively by adding a 'JUMP process' described later to the same encryption system and decryption system of the third embodiment. Note that this JUMP process may also be used for the encryption system and the decryption system of the second embodiment and the pseudorandom number generating system of the fourth embodiment.
Sixth Embodiment: Proposes a method of performing more complicated encryption by generating the pseudorandom number sequence, which is used in the respective second through fifth embodiments, using the method of the first embodiment.

Each of the embodiments is described forthwith in turn.

<1. First Embodiment>

The first embodiment is a pseudorandom number generating system, which is characterized in that it successively takes product of a word in a cryptographically secure pseudorandom number sequence generated from a pre-prepared sequence of numbers (shared key) and a word stored in single word memory, stores result thereof in the single word memory, and generates a secure cryptographic random number sequence from the most significant bit and subsequent bits thereof. Use of a shared key as a sequence of numbers in encrypted communication allows use of the generated cryptographic random number sequence for encryption and decryption of text by a stream cipher.

(1-1. Outline and Problems of Conventional Stream Ciphers)

Assuming BL as a collection of text blocks b, a stream cipher prepares on the encryption side a sequence of encryption functions $$E_i: BL \to BL'$$

where $E_i$ is constituted by $E_1, E_2, \ldots$; prepares on the decryption side a sequence of decryption functions $$D_i: BL' \to BL$$

where $D_i$ is constituted by $D_1, D_2, \ldots$; encrypts a sequence of message blocks $b_1, b_2, \ldots$ so as to satisfy $D_i(E_i(b))=b$ for all of the blocks b in BL; and transmits them as $E_1(b_1), E_2(b_2), \ldots$; while on the decryption side they are subjected to $D_1, D_2, \ldots$, and thus encrypted.

Typically, a pseudorandom number sequence: $r_1, r_2, \ldots$, which are elements of BL, is generated and is subjected to following operations:

$$E_i(b) := b \text{ EXOR } r_i$$
$$D_i(b) := b \text{ EXOR } r_i$$

Namely, the transmission side and the reception side should each have a pseudorandom number sequence $r_i$ generating means.

FIG. 4(a) shows the conventional stream cipher processing flow given above. A next state function 462 is applied to the content of memory 420 (state memory), generating a pseudorandom number sequence PN, which is then stored in the memory 420. Through repetition thereof, the content of the memory 420 is successively transformed. The content of the memory 420 is transformed using an output function 464 and is used as a pseudorandom number sequence PN.

An encryption function 470 (corresponds to $E(r_i, b_i)$ in the above given example) is computed for the generated PN (corresponds to $r_i$ in the above given example) and a plaintext message M (sequence of blocks), providing a ciphertext C (cryptography).

As shown with the encryption function 470 of FIG. 4(a), small circles provided on the functions indicate that inverse functions may be generated or easily computed using a computer. The meaning of this small circle is the same in subsequent drawings. This means that there is a decryption function $D(r_i, c_i)$ satisfying $D(r_i, E(r_i, b)) = b$. In the above-given typical example of the stream cipher, E and D are EXOR.

A block cipher is a stream cipher where $E_1 = E_2 = \ldots$, and $D1 = D2 = \ldots$ accordingly.

The conventional stream cipher (for example, B. Schneier, "Applied Cryptography," John Wiley & Sons, Inc., 1996. pp. 369~428) shown in FIG. 4(a) has cryptographic strength due to either high complexity of the next state function 462 (e.g., with the aforementioned conventional technology BBS (Blum-Blum-Shub), an integer of a large number of orders of magnitude is stored in memory, and the next state function executes modulo operation: the squared figure of that integer mod M), or high complexity of the output function 464 (e.g., hash function), or high complexity of the encryption function 470 (e.g., block encryption).

However, if the next state function is complicated, speed of generating the pseudorandom number sequence PN decreases. Furthermore, PN period and distribution cannot be calculated.

If the next state function is linear, then PN may be generated quickly, and period and distribution may be calculated. As an example, there is the Mersenne Twister (MT) (regarding the Mersenne Twister, refer to http://www.math.keio.ac.jp/~matsumoto/mt.html, M. Matsumoto and T. Nishimura, "Mersenne Twister: A623-dimensionally equidistributed uniform pseudorandom number generator", ACM Trans. on Modeling and Computer Simulation Vol. 8, No. 1, January pp. 3-30 (1998)). These pseudorandom numbers are quickly generated and have a long period. However, if the output function is simple, internal state can be estimated based on an output sequence. Therefore, it cannot be called cryptographically secure.

(1-2. Pseudorandom Number Generating System of This Embodiment)

On the other hand, the pseudorandom number generating system (called cryptMT) of this embodiment transforms a pseudorandom number sequence PN, which may not be cryptographically secure, to a secure pseudorandom number sequence SPN.

Figure 5:
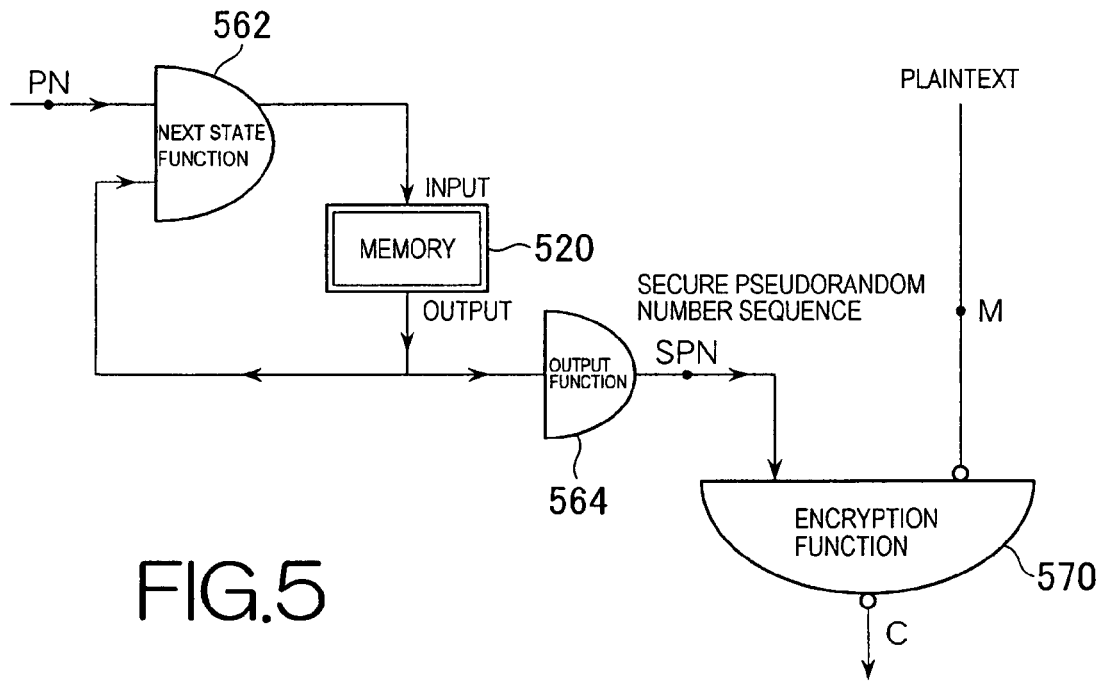
FIG. 5 is a diagram showing processing flow for the pseudorandom number generating system of the first embodiment.

FIG. 5 is a diagram showing processing flow for the pseudorandom number generating system of this embodiment. Note that before the PN (pseudorandom number sequence that may not be cryptographically secure) shown in FIG. 5, the processing to the left of the PN in FIG. 4(a) is conducted. Also note that this structure may be repeated several times in this embodiment. In other words, the processing up until SPN generation of FIG. 5 may further continue to the position of PN or entry to FIG. 5.

The following cases are the most effective in speed vs. security with the structure of this embodiment shown in FIG. 5.

In the PN generation section (left of PN in FIG. 4(a) continuing to FIG. 5), a high-speed linear generating method for multi-dimensional distributions (the next state function 462 of FIG. 4(a) is linear; e.g., the aforementioned MT) is employed.

The next state function 562 in the PN to SPN conversion section may be a non-linear function but can be computed quickly (e.g., the function is multiplication of 32-bit integers).

The output function 564 in the SPN conversion section may be a simple function that can be computed quickly (e.g., takes upper significant 8 bits from 32 bits, but discards the remaining bits).

cryptMT of this embodiment employs the method providing these effects. Note that since multiplication is used and product of even numbers based on modulo $2^{(32)}$ is not reversible, the least significant bit of output of MT must be forcibly set to 1.

Processing in the case of performing encryption and decryption of text (plaintext) by a stream cipher using the pseudorandom number generating system of this embodiment is described forthwith while referencing FIGS. 4(a) and 5. Note that as described above, an example using the Mersenne Twister as the next state function 462 of FIG. 4(a) is described here.

(1) Generate data of 624 words through a nonlinear initialization method (init_by_array) using a shared key (key 430 in FIG. 4(a)) as an initial seed array, and initialize Mersenne Twister (hereafter referred to as MT) mt19937ar.c. This corresponds to the processing of key conversion 432 of FIG. 4(a), which initializes the state memory (memory 420) of MT (next state function 462). The output function 464 simply outputs the first word to the memory 420.

(2) Set an output word sequence of the initialized MT to (M(0), M(1), M(2), . . . . This is the pseudorandom number sequence PN (pseudorandom number sequence that may not be cryptographically secure) shown in FIG. 4(a) and is sent to FIG. 5 (corresponds to PN in the upper left corner of FIG. 5). Note that M(n) is the result of forcibly setting the least significant bit of the output of MT to 1, as mentioned above.

(3) Prepare memory (variable) accum for 1 word constituted by 32 bits. This corresponds to memory 520 in FIG. 5.

(4) Substitute an initial value (e.g., 1) for accum. Note that the initial value may be another value (other than zero).

(5) Conduct the following substitution repeatedly hereafter (next state function 562):

$$accum \leftarrow accum \times M(n) \pmod{2^{\{32\}}}$$

Here, the first 64 substitutions do not provide output, but from the 65th substitution until a predetermined number of times, the upper significant 8 bits of accum are successively output (output function 564). This allows output of a cryptographically secure pseudorandom number sequence of 8-bit integers (SPN).

Note that the repetition count for the aforementioned computation is merely an example, and should be another count according to an application system. Furthermore, instead of the aforementioned upper significant 8 bits of accum, all or a part of the bit sequence of accum may be output successively (e.g., output every other bit) as the secure pseudorandom number sequence.

(6) The output secure SPN and the text (plaintext M) (corresponds to encryption function 570) are exclusive-ORed and the resulting ciphertext C is then output.

Alternatively, the processes (2) through (5) given above may be conducted in the following manner. Data having the least significant bit of the nth word data of the pseudorandom numbers generated by MT set to 1 is called M(n), and a sequence of numbers generated based on shared key data using a hash function is stored in the 32-bit memory accum and set as the initial value of accum. Here, the least significant bit of this sequence of numbers may be forcibly set to 1. Next, $$accum \leftarrow accum \times M(n) \pmod{2^{\{32\}}}$$

is computed for n=1, 2, 3, . . . , and the upper significant 8 bits of accum are output as a cryptographically secure pseudorandom number sequence of 8-bit integers.

(1-3. Effects)

By using MT (mt19937ar.c) as the pseudorandom numbers in this embodiment, the output encrypted random number sequence having period $2^{19937}-1$ can be mathematically verified. This period is longer than any conventionally known encrypted random number sequence, and may be securely used over a long time.

Furthermore, performing nonlinear computation (multiplication) on accum and not using the remaining linear least significant bit gives sufficient security as an encrypted random number sequence.

Moreover, by a function called 32-bit multiplication, capable of being relatively quickly calculated, transforming pseudorandom numbers, which are not cryptographically secure but can be generated quickly using, for example, MT, an encrypted random number generating method using this algorithm can be executed very fast and is 1.5 times faster than the fastest optimizer of AES or current American standard encrypted random number generating method.

Furthermore, resistance to time-memory-trade-off attacks is strong due to size of the internal state of MT.

(1-4. Applications of This Embodiment)

(1) Application 1

The pseudorandom number generating system of this embodiment described above is slower in multiplication than in random number generation due to properties of hardware.

In this application, in order to accommodate this problem, multiple memories (accumulators) (4 memories) storing multiplication results are prepared, which are used alternately to increase the computing speed. Since newest personal computer CPUs can execute multiple multiplication operations in parallel, this kind of process is possible.

Figure 8:
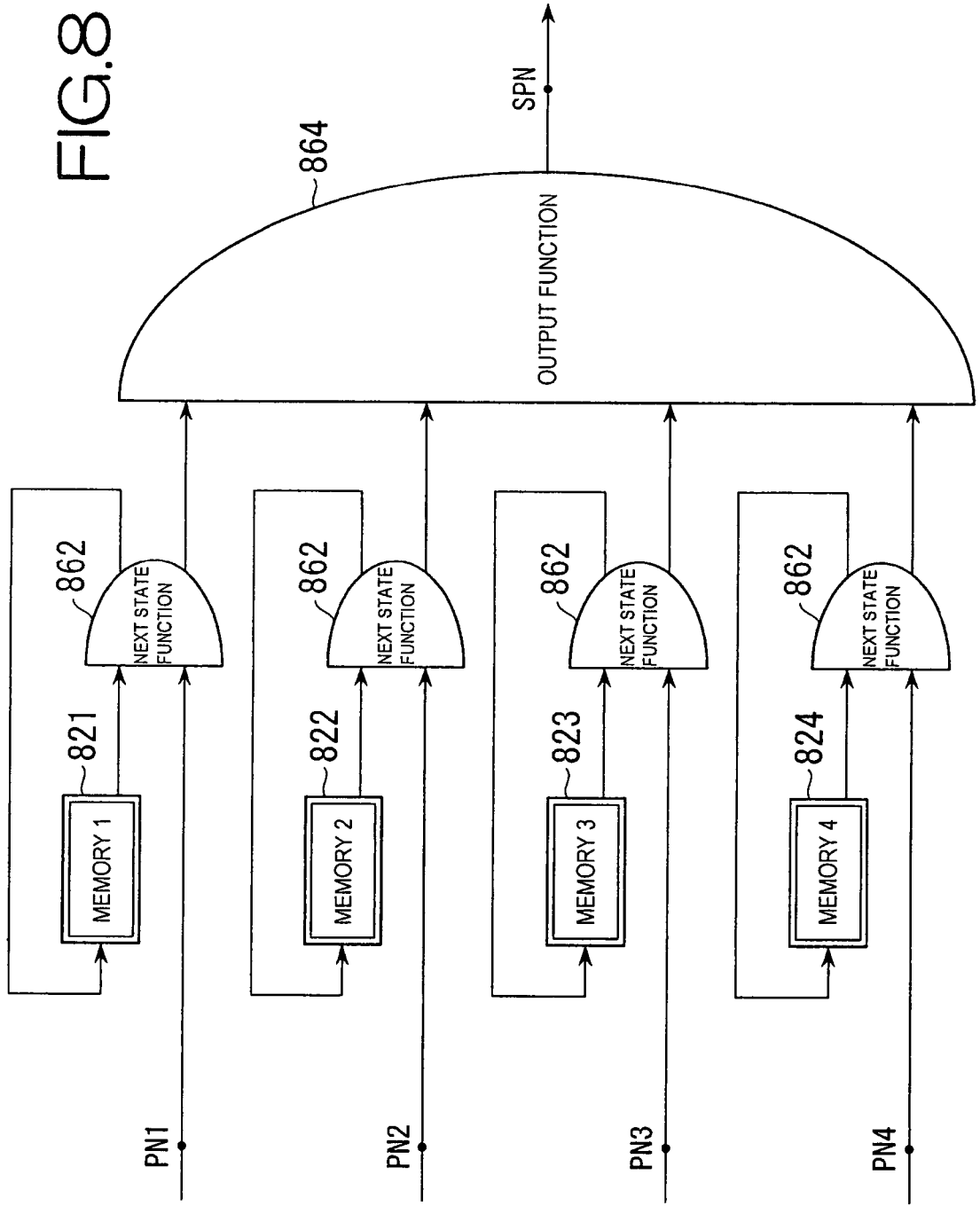
FIG. 8 is a diagram showing processing flow for Application 1 using four memories in the pseudorandom number generating system of the first embodiment.

FIG. 8 is a diagram showing processing flow for the pseudorandom number generating system of this embodiment (FIG. 5) using four memories (accumulators). Note that FIG. 8 corresponds to the processing shown on the left side of the SPN (secure pseudorandom number sequence) in FIG. 5.

In FIG. 8, PN1, PN2, PN3, PN4 . . . are selections in order from output of non-secure pseudorandom numbers (PN). A next state function 862 and an output function 864 are the same as the next state function 562 and the output function 564 of FIG. 5. Note that parts of the bit sequence are retrieved from the four memories alternately and output as the secure pseudorandom numbers (SPN) (output function 864).

Results of multiplying the 1st, 5th, 9th, 13th, . . . numbers (PN1, PN5, PN9, PN13, . . . ) of the pseudorandom number output are accumulated in the first memory (memory 1_821), results of multiplying the 2nd, 6th, 10th, 14th, . . . numbers (PN2, PN6, PN10, PN14, . . . ) of the pseudorandom number output are accumulated in the second memory (memory 2_822), results of multiplying the 3rd, 7th, 11th, 15th, . . . numbers (PN3, PN7, PN11, PN15, . . . ) of the pseudorandom number output are accumulated in the third memory (memory 3_823), and results of multiplying the 4th, 8th, 12th, 16th, . . . numbers (PN4, PN8, PN12, PN16, . . . ) of the pseudorandom number output are accumulated in the fourth memory (memory 4_824).

Note that order of the pseudorandom number output and order in which the respective memories output are not limited to this order.

(2) Application 2

Addition, OR, exclusive-OR, and shift (particularly right shift) operations as well as multiplication operation may be performed. In this case, if multiple accumulators (memories) are prepared as in Application 1, numbers stored in other memories as well as generated random numbers may be stored in a memory for computation.

More specifically, for example, the following processing is performed:

(1) Add a random number to each accumulator (add a different random number respectively as in Application 1).

(2) Store in each accumulator the resulting value of exclusive-ORing the content of each accumulator and 'resulting value of right shifting the content of a different accumulator'.

(3) Store in each accumulator the resulting value of multiplying 'resulting value of ANDing the content of each accumulator and number 1' by 'resulting value of ANDing a random number (i.e., a random number given in step (1) to another accumulator not selected in step (2)) and a value of 1'.

(4) Output predetermined upper significant bits of each accumulator in a predetermined order.

FIG. 9 is a diagram showing an exemplary processing flow for the pseudorandom number generating system of this embodiment (FIG. 5) performing (1) through (4) given above using four memories (accumulators). Note that as in FIG. 8, this corresponds to the processing shown on the left side of SPN (secure pseudorandom number sequence) in FIG. 5.

As in FIG. 8 (Application 1), four word memories (memory 1_921, memory 2_922, memory 3_923, memory 4_924) are called Acc1, Acc2, Acc3, and Acc4 respectively and output of non-secure pseudorandom numbers (PN) (PN1, PN2, PN3, PN4, . . . ) are called no1, no2, no3, and no4, . . . . The flowchart of FIG. 9 shows the processing of (1) through (4) when they are performed in Step 1 through Step 4 given below.

(1) Step 1
Acc1←Acc1+no1
Acc2←Acc2+no2
Acc3←Acc3+no3
Acc4←Acc4+no4

(2) Step 2
Temp←Acc1
Acc1←Acc1 EXOR (Acc2>>11)
Acc2←Acc2 EXOR (Acc3>>11)
Acc3←Acc3 EXOR (Acc4>>11)
Acc4←Acc4 EXOR (Temp>>11)
('EXOR' denotes exclusive-OR, and '>>11' denotes shifting 11 bits to the right. Note that amount of shifting is not limited to 11 bits.)

(3) Step 3
Acc1←(Acc1 OR 1)×(no4 OR 1)
Acc2←(Acc2 OR 1)×(no1 OR 1)
Acc3←(Acc3 OR 1)×(no2 OR 1)
Acc4←(Acc4 OR 1)×(no3 OR 1)
('OR' denotes logical add.)

(4) Step 4
The upper significant 16 bits of Acc1, the upper significant 16 bits of Acc2, the upper significant 16 bits of Acc3, and the upper significant 16 bits of Acc4 are output in this order as secure pseudorandom numbers. Note that the output order is not limited to this order.

Step 1 through Step 4 are repeated for the next pseudorandom number sequence.

(1-5. Exemplary Structure of Encryption System and Decryption System Using This Embodiment)

A system configuration of performing encryption and decryption of text (plaintext) by a stream cipher using the pseudorandom number generating system of this embodiment is described forthwith while referencing the system configuration of FIG. 1.

The system of this embodiment is implemented in a terminal such as a typical personal computer, for example. As shown in FIG. 1, an encryption system 110 is implemented in a terminal on the side that encrypts and transmits text while a decryption system 150 is implemented in a terminal on the side that receives and decrypts the text. Furthermore, both the encryption system 110 and the decryption system 150 prepare a sequence of numbers (shared key 122) and the pseudorandom number generating system 130 of this embodiment.

The encryption system 110 generates a secure pseudorandom number sequence 125 based on the shared key 122 in conformity with a pseudorandom number generating program 132 of the pseudorandom number generating system 130 using the method of this embodiment described above. Next, as a typical example of a stream cipher, an encryption program 136 encrypts a text 124 by taking exclusive-OR of the secure pseudorandom number sequence 125 and the text 124 to generate a ciphertext 140.

Meanwhile, the decryption system 150 generates a secure pseudorandom number sequence 125 based on the shared key 122 in conformity with the pseudorandom number generating program 132 of the pseudorandom number generating system 130 using the method of this embodiment described above. Next, a decryption program 166 deciphers the ciphertext 140 by taking exclusive-OR of the secure pseudorandom number sequence 125 and the text 124 to reconstruct the text 124. Since the encryption system 110 and the decryption system 150 uses the same pseudorandom number generating program 132 to generate the same secure pseudorandom number sequence 125 based on the same shared key, they are capable of conducting encryption and corresponding decryption.

<2. Second Embodiment>

The second embodiment is a block cipher and shows a fundamental example of an encryption system and a decryption system, which generate a ciphertext by transforming block by block a text divided into blocks using a function, which is selected from a pseudorandom number sequence (expanded key) generated based on a shared key. The pseudorandom number sequence generated based on the shared key is used as a parameter for function selection and selected function. With the third embodiment described later, the longer a text becomes, the more the pseudorandom number sequence is consumed, however, only a fixed length is consumed in the second embodiment. Therefore, a pseudorandom number sequence with a fixed length generated based on a shared key is called 'expanded key'.

(2-1. Outline and Problems of Conventional Block Cipher)

Figure 4B:
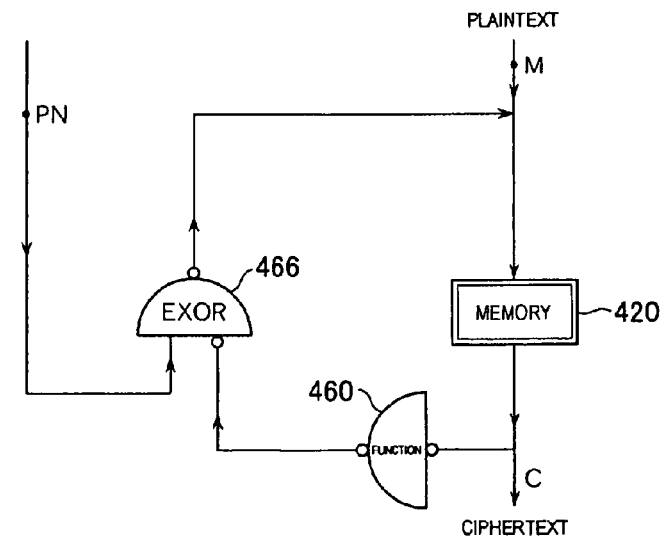
FIG. 4(b) is a diagram showing processing flow for a conventional block cipher.

A conventional block cipher such as AES is configured as shown in FIG. 4(b). In other words, a block of plaintext M is taken and stored in the memory 420, and transformed (EXOR shown in 466) using a pseudorandom number sequence PN, and the resulting transformed values are written in the memory 420. This is repeated several times to obtain a ciphertext C. Function 460 on the bottom right of the drawing is a complicated bijection. Note that as described above with FIG. 4(a), small circles provided on the functions indicate that inverse functions may be generated or easily computed using a computer.

However, as mentioned before, since the conventional block cipher creates a complicated encryption function based on key information and transforms plaintext based thereupon, this develops a problem that a fast cryptosystem creates one-sided functions, which makes it easier to obtain information for deciphering. For example, when trying to decipher a code, attacking through encrypting a well-known plaintext using differential cryptanalysis, linear cryptanalysis or the like is often used. In other words, in difficult conditions in which it is easy for attackers to encrypt an arbitrary text, data used for encryption may be collected, and the code may be broken more easily than by searching all keys.

(2-2. Processing Flow)

This embodiment takes the following structure to solve the conventional problems.

Figure 6:
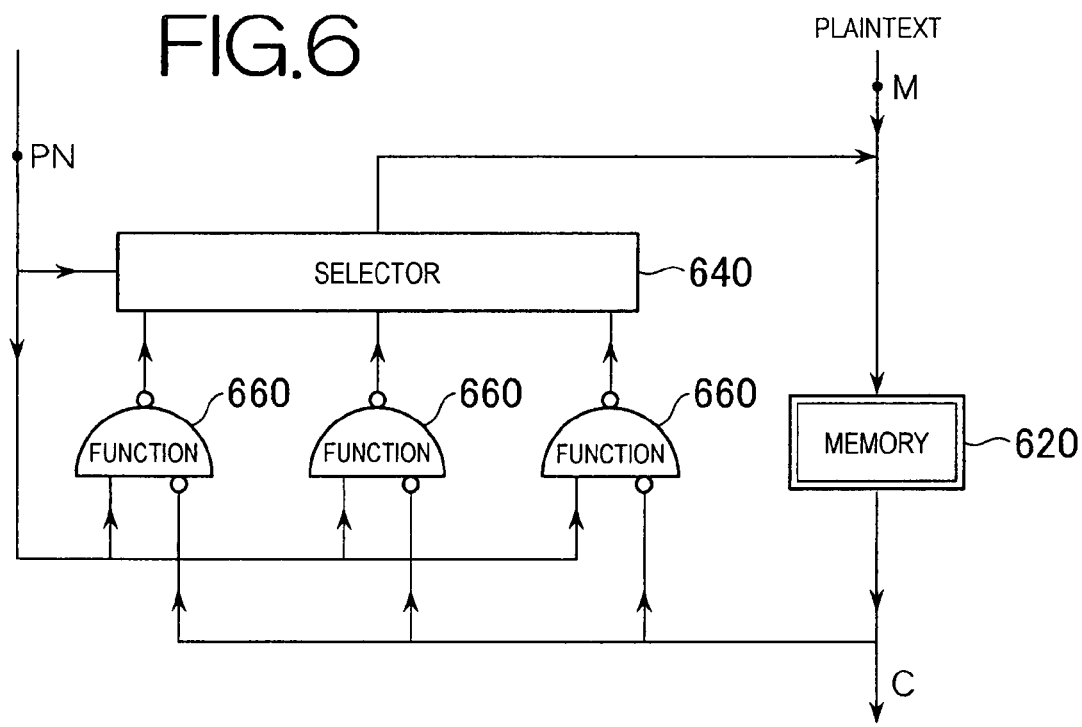
FIG. 6 is a diagram showing processing flow for the encryption system of the second and the third embodiment and the pseudorandom number generating system of the fourth embodiment.

FIG. 6 is a diagram showing processing flow for encryption system of this embodiment. Note that processing of an encryption system of the third embodiment described later is also shown in this diagram.

In this embodiment (and the third embodiment), for a collection BL of blocks b, a simple function $$F: PARAM \times BL \rightarrow BL$$

and a function equivalent to an inverse operation thereof $$F': PARAM \times BL \rightarrow BL$$

are prepared in plurality (where F'(P,F(P,b))=b is satisfied), and as shown in FIG. 6, contents of memory 620 in which a block of plaintext M is taken and stored are transformed repeatedly while consuming the pseudorandom number sequence PN (PN shown in the upper left of FIG. 6) as parameter P to obtain a ciphertext C. When transforming, PN is transmitted to a selector 640 to select one of functions 660 (corresponds to aforementioned F) for use.

By adopting the above-given structure, freedom in combinations of functions in this embodiment (and the third embodiment) exponentially increases, allowing implementation of a strong cipher.

Furthermore, there is flexibility to take in a parameter (where there is no white circle on the function 660 in FIG. 6) from the pseudorandom number sequence PN, allowing implementation of a stronger cipher.

Moreover, if the pseudorandom number sequence PN is generated through the aforementioned MT using a shared key as the key 430 shown in FIG. 4(a), any desired amount of PN may be generated. This allows increase in repetition count for transforming plaintext by the function 660, and increase in encryption strength.

In FIG. 6, when the plaintext is constituted by multiple blocks, encryption of each block by a combination of different functions is possible (namely, it may be used as a stream cipher.)

(2-3. Preconditions)

This embodiment is explained giving as an example an encryption method using shared key information of 128 bits or more where 1 block is constituted by 4 words (alternatively, 8 words or 16 words may be used).

As preprocessing, the shared key is expanded to a required size by a hash function to generate a pseudorandom number sequence PN or an expanded key (corresponds to PN in the upper left of FIG. 6). In this embodiment, the text is divided into block size (4 words) and transformed per block.

(2-4. Functions to Prepare)

The following seven types of functions (correspond to the functions 660 in FIG. 6) with completely different properties, which can transform block data quickly, are used for block transformation. These functions are called a primitive encryption family (PEF) hereafter. In this embodiment, four types of functions (word-wise logical functions) performing computations within words, and three types of functions (inter-word functions) performing computations across multiple words within a block are prepared. Note that in decryption, an inverse function corresponding to a word-wise logical function is called a word-wise logical inverse function, and an inverse function corresponding to an inter-word function is called an inter-word inverse function.

Data of a t-th block in the expanded key (pseudorandom number sequence PN) is used for a t-th computation (transformation) Furthermore, the last block of the expanded key is used for function selection.

(a) Intra-word Computation (Four Types)
(1) EXOR: Each word of the block is exclusive-ORed with the data of the t-th block in the expanded key.
(2) +: The data of the t-th block in the expanded key is added to each word of the block in conformity with modulo $2^{32}$.
(3) ×: Each word of the block is multiplied by the value resulting from changing corresponding respective least significant bits of respective words in the t-th block of the expanded key to 1 in conformity with modulo $2^{32}$. Note that for this transformation, all inverse functions of the multiplication for the words of the expanded key for which the least significant bit is changed to 1 are pre-computed and pre-stored such that they may be looked up.
(4) Horizontal shift: Shift to the right each word of the block by the numeric value of the lower significant 5 bits of each corresponding word in the t-th block of the expanded key. Invert bits extending beyond the right end of the word, and write them on the left end.

(b) Computation Across Words (Three Types)
(5) Vertical rotation: 1 block is considered an array of 4 words (in the case where 1 block is constituted by 4 words. Note that it is an array of 8 words when 1 block is constituted by 8 words, and it is an array of 16 words when 1 block is constituted by 16 words), in other words, a matrix of 4 rows by 32 columns of 0s and 1s (there are 8 rows by 32 columns when 1 block is constituted by 8 words, and 16 rows by 32 columns when 1 block is constituted by 16 words). One word is extracted from the t-th block of the expanded key. Columns corresponding to where bits that are 1 in the word are bit inversed, and shifted by one row downward. Data in the lowest row is written to the top row (rotated).
(6) Substitution: Extract two bits from the t-th block of the expanded key four times (in the case where 1 block is constituted by 4 words. Note that it is three bits when 1 block is constituted by 8 words, and four bits when 1 block is constituted by 16 words), and exchange four times between the k-th row and the ((k+5) mod 8)-th row of the block arranged according to k where k denotes a numeric value of each extracted bit (in the case where 1 block is constituted by 4 words. Note that it is the ((k+5) mod 4) -th row when 1 block is constituted by 8 words, and the ((k+5) mod 16)-th row when 1 block is constituted by 16 words).
(7) Exclusive-OR substitution: Extract two bits from the t-th block of the expanded key four times (in the case where 1 block is constituted by 4 words. Note that it is three bits when 1 block is constituted by 8 words, and four bits when 1 block is constituted by 16 words), and take exclusive-OR of the k-th.row and the ((k+7) mod 4)-th row of the block arranged according to k four times, where k denotes a numeric value of each extracted bit (in the case where 1 block is constituted by 4 words. Note that it is the ((k+7) mod 8)-th row when 1 block is constituted by 8 words, and the ((k+7) mod 16)-th row when 1 block is constituted by 16 words).

(2-5. Encryption of Text)

Encryption of text divides a text into blocks, selects the above-given functions for respective blocks depending on the expanded key (pseudorandom number sequence PN) as follows, and transforms them. As described above, the data of the t-th block in the expanded key is used as parameters for the functions (functions 660 of FIG. 6) for the t-th computation (transformation). Furthermore, the last block of the expanded key is used for function selection. To describe with FIG. 6, the last block of PN is transmitted to the selector 640, and the selector 640 selects a function 660.

In this embodiment, each block of the text (i.e., block of the plaintext M taken and stored in the memory 620 of FIG. 6) is subjected to the seven functions given above, which is considered 1 set, in the order of 'horizontal shift, ×, vertical rotation, (substitution or exclusive-OR substitution), and (+ or EXOR)', where 8 sets are performed to transform each block. However, regarding the last two terms each given within parentheses including two types of functions, the former type is chosen if 0 and the latter type is chosen if 1 successively using one bit at a time from the last block of the expanded key for 2×8 times. In this case, since computation (transformation) is performed (t=) 40 times, an expanded key with the size of 41 blocks is generated, where the last 41st block is used for function selection.

Note that the above-given functions (1) through (7) are merely examples, and other operations capable of fast processing may be prepared. The above-given combinations and order of functions are also mere examples, and other combinations and order may be used. Furthermore, number of repeating times may be more than 8 sets. A method of performing all of the types of transformation in the first and the last set, and repeating selection of one of the functions between those sets except for the first and the last set five times or more, for example, may be used. The reason for repeating a set multiple times is because security must be increased in order to subject all of the blocks to the same transformation in this embodiment.

(2-6. Decryption of Text)

Decryption can be computed in approximately the same time as encryption in this embodiment as long as inverse mapping of respective transformations is applied in reverse order of the encryption.

(2-7. Effects)

According to the encryption system and the decryption system of this embodiment, a large amount of text may be encrypted quickly since the respective transformations are fast, and decryption is more complicated than with the conventional block cipher since type and order of applied functions are unknown.

(2-8. Exemplary Structure of Encryption System and Decryption System Using this Embodiment)

A system configuration of performing encryption of text using the encryption system and the decryption system of this embodiment is described forthwith while referencing FIG. 2. Note that the same system configuration may be used for the third embodiment and the fifth embodiment described later.

The encryption system and the decryption system of this embodiment are implemented in terminals such as a typical personal computer, for example. As shown in FIG. 2, an encryption system 110 is implemented in a terminal on the side that encrypts and transmits text while a decryption system 150 is implemented in a terminal on the side that receives and decrypts the text. Furthermore, a shared key 122 and multiple functions 126 used for encryption are prepared in the encryption system 110 while a shared key 122 and multiple inverse functions 128 (functions performing respective inverse operations corresponding to the respective functions 126) used for decryption are prepared in the decryption system 150.

As described above, the encryption system and the decryption system of this embodiment have a primary aspect of using shared key information (pseudorandom number sequence generated based on the shared key) as a parameter for selection of encryption functions and for selected functions, thereby implementing fast and highly secure systems. In the encryption system 110, a pseudorandom number sequence 225 (the expanded key in this embodiment) is first generated based on the shared key 122 by a pseudorandom number generating program 232. Next, a function selecting program 234 selects a function to be used to encrypt the text 124 from functions 126 using the generated pseudorandom number sequence (expanded key) 225. In addition, an encryption program 236 uses the pseudorandom number sequence (expanded key) 225 as a parameter for the function selected by the function selecting program 234 to execute the function and encrypt the text 124. This allows generation of the ciphertext 140.

Meanwhile, with the decryption system 150, the same pseudorandom number sequence 225 (expanded key) as with a transmission terminal 110 is first generated based on the shared key 122 by the pseudorandom number generating program 232. Next, an inverse function selecting program 264 selects an inverse function to be used to decrypt the ciphertext 140 received from the inverse function 128 using the generated pseudorandom number sequence (expanded key) 225. Here, the inverse function corresponding to the function selected by the transmission terminal 110 is selected. A decryption program 266 uses the pseudorandom number sequence (expanded key) 225 as a parameter for the inverse function selected by the inverse function selecting program 264 to execute the inverse function and decrypt the ciphertext 140. This allows reconstruction of the text 124.

<3. Third Embodiment>

The third embodiment is a stream cipher and shows an example of an encryption system and a decryption system, which generate a ciphertext by transforming block by block a text divided into blocks using a function, which is selected based on a pseudorandom number sequence (expanded key) generated based on a shared key. Information of the shared key (the pseudorandom number sequence generated based on the shared key) is used as parameters for function selection and selected function.

The system configuration of this embodiment is as described in the above-given second embodiment using FIG. 2. In addition, processing flow thereof is as described in the second embodiment using FIG. 6. The difference from this embodiment and the above-given second embodiment is that: in the second embodiment (block cipher), when multiple functions are once selected and parameters are determined, all of the blocks are transformed using the same functions and parameters while in this embodiment (stream cipher), function and parameter are decided per block of the text and then transformation is performed. In other words, when there are two identical blocks, these two blocks are transformed into the same ciphertext in the second embodiment, but are transformed into different ciphertexts in the third embodiment since functions and parameters are also different. Furthermore, as described above, the second embodiment only uses a fixed length pseudorandom number sequence (expanded key), but the third embodiment consumes pseudorandom numbers depending on length of the text.

(3-1. Preparation)

Pseudorandom numbers are generated based on a shared key to prepare 32 types of multiplicand (odd-numbered 32-bit long unsigned random integers). Respective multiplicative inverses are computed based on mod $2^{32}$ and put into a table.

(3-2. Macro Constants to be Determined by User)

(1) Define number of words (Tuple) per block.
define Log_Tuple 2
define Tuple (1UL<<Log_Tuple)

In this embodiment, 1 block is constituted by Tuple number of words.

Value of Tuple is two to a certain power and must be 4 or more and 16 or less.

The logarithm of the value of tuple with respect to a base 2 is specified as Log_Tuple.

This describes a case where 1 block is constituted by 4 words.

(2) Define number of times of transformation (Iteration) through encryption functions for the blocks of the text.
define Iteration 10

This describes a case where the times of transformation is 10 times.

(3-3. Global Variables)

Array in which text (plaintext) to be encrypted is a two-dimensional array.
msg[Msg_Length] [Tuple]
である。Global variables used in this embodiment are as follows.

(1) Store text (plaintext) to be encrypted.
unsigned long msg[Msg_Length] [Tuple];

(2) Directly rewrite the array msg and encrypt.
hmnencode(key[], init_value[])

(3) Directly rewrite the array msg and decrypt.
hmndecode(key[], init_value[])

(3-4. Functions to Prepare)

In this embodiment, five types of functions performing computations within words, and three types of functions performing computations across multiple words within a block, a total of 8 types of functions are prepared ahead of time as functions (PEF) (correspond to the functions 660 of FIG. 6) used to transform blocks constituted by Tuple number of words.

All of these functions are represented by a mapping:

$$PEF: BL \times PARAM \rightarrow BL$$

Here, BL denotes a collection of blocks of the text, and PARAM denotes a parameter provided to the function, where PARAM, like BL, is a collection of data constituted by Tuple number of words and is obtained from the pseudorandom number sequence PN.

The case of Tuple=4 as an example is stated as $$(w_1, w_2, w_3, w_4) \leftarrow PEF(w_1, w_2, w_3, w_4; p_1, p_2, p_3, p_4)$$

The eight types of PEF function and inverse functions thereof (_inv) are described forthwith. Note that these (1) through (8) are merely examples, and other operations capable of fast processing may be prepared.

(a) Five types of computation within a word (word-wise logical functions and corresponding word-wise logical inverse functions)

(1) crypt_plus
crypt_plus $$w_i \leftarrow w_i + p_i \ (i=1, 2, 3, 4).$$

crypt_plus_inv $$w_i \leftarrow w_i - p_i \, (i=1, 2, 3, 4).$$

(2) crypt_exor
crypt_exor $$w_i \leftarrow w_i EXOR \, p_i \, (i=1, 2, 3, 4).$$

crypt_exor_inv $$w_i \leftarrow w_i EXOR \, p_i \, (i=1, 2, 3, 4).$$

(3) crypt_multi

Latest CPUs have a multiplication instruction, but is slow in computing division. Therefore, in this embodiment, Multi_Size number (32) of multiplication random constant numbers are prepared as described in aforementioned (3-1. Preprocessing) and stored in a global variable array multi_table.

In the actual process:
1) when prepare_multi( ) is called, random numbers are stored in multi_table.
2) lower significant bits are forcibly transformed, and that with 3 provided based on mod 7, and that with 7 provided based on mod 16 are alternately stored in multi_table. This generates a multiplication group based on arithmetic modulo $2^{32}$.
3) when prepare_multi_inv( ) is called, multiplicative inverses of those in multi_table are stored in inv_table.

crypt_multi $$w_i \leftarrow w_i \times \text{multi\_table [upper significant 5 bits of } p_i\text{]}$$

$$w_i \leftarrow w_i - p_i$$

These are performed for i=1, 2, 3, and 4. In other words, multiplicative constants corresponding to upper significant 5 bits of parameter $p_i$ are read out from multi_table[ ] and then multiplied to $w_i$ respectively. Since discarding of lower significant 27 bits of $p_i$ is a waste, $p_i$ is subtracted from $w_i$.

crypt_multi_inv $$w_i \leftarrow w_i + p_i$$

$$w_i \leftarrow w_i \times \text{inv\_table [upper significant 5 bits of } p_i\text{]}$$

These are performed for i=1, 2, 3, and 4.

(4) crypt_hori_rotate
crypt_hori_rotate

Bits of each word are inverted and then horizontally rotated.

In other words,

Upper significant 5 bits of $p_i$, are moved to $s_i$ except that the fourth bit from the bottom is always set to 1, OR of $w_i \leftarrow$(value resulting from bit-inverting $w_i$ and then bit-shifting to the right by $32-s_i$) and (value resulting from shifting $w_i$ to the left by $s_i$)

$$w_i \leftarrow w_i - p_i$$

are performed for i=1, 2, 3, and 4. The fourth bit is set to 1 in order to rotate even if the parameter is 0.

crypt_hori_rotate_inv
Inverse transformation of the above (5) crypt_hori_rightshift
crypt_hori_rightshift Bits for each word are inverted and then horizontally rotated.

In other words, upper significant 5 bits of $p_i$ are moved to $s_i$ except that the fifth bit from the bottom is always set to 1, $w_i \leftarrow w_i$ EXOR (value resulting from bit-shifting $w_i$ to the right by $s_i$ and then bit-inverting the shifted value) and $$w_i \leftarrow w_i + p_i$$

are performed for i=1, 2, 3, and 4. The fifth bit is set to 1 in order to rotate even if the parameter is 0 and to facilitate inverse transformation.

crypt_hori_rightshift_inv
Inverse Transformation of the Above (b) Three types of computation across words (inter-word functions and corresponding inter-word inverse functions)

(6) crypt_vert_rotate
crypt_vert_rotate $$\text{key} \leftarrow p_1 + p_4$$

key is considered a 32-bit random pattern.

Bits of $w_1$, $w_2$, $w_3$, and $w_4$ corresponding to a bit of 1 in key are inverted and vertically rotated. Since leaving lots of random numbers unused is a waste, $$w_i \leftarrow w_i + p_i$$

is computed for i=1, 2, 3, and 4.

crypt_vert_rotate_inv
Inverse Transformation of the Above (7) crypt_add_permute
crypt_add_permute A sum is computed as follows:

$$w_i \leftarrow w_i + w_j$$

for i=1, 2, 3, and 4. Here, j is determined using lower significant 2 bits (Low_Mask) of $p_i$. When it happens to be the same as i, j is incremented based on modulo Low_Mask.

For effective utilization of $p_1$-$p_4$, $$w_i \leftarrow w_i EXOR \, p_i$$

is computed for i=1, 2, 3, and 4.

crypt_add_permute_inv
Inverse transformation of the above (8) crypt_exor_permute
crypt_exor_permute A sum is computed as follows:

$$w_i \leftarrow w_i EXOR \, w_j$$

for i=1, 2, 3, and 4. Here, j is determined using lower significant 2 bits (Low_Mask) of $p_i$. When it happens to be the same as i, j is incremented based on modulo Low_Mask.

For effective utilization of $p_1$-$p_4$, $$w_i \leftarrow w_i - p_i$$

is computed for i=1, 2, 3, and 4.

crypt_exor_permute_inv
Inverse Transformation of the Above (3-5. Pseudorandom Number Sequence)

Here, the above-given MT (mt19937ar.c) is used as a generating method for the pseudorandom number sequence PN (corresponds to PN in the upper left of FIG. 6). mt19937ar.c functions to receive an array with an arbitrary length as an initial value.

The pseudorandom number sequence is read in four words at a time. Since internal array length 624 can be divided by 4, a pseudorandom number sequence is re-generated for the entire array every 624/4-th read-in.

Using genrand_fourint32(param)

32-bit long unsigned random integers are read in to param[0] through param[3].

With crypt_ . . . (unsigned long block[Tuple])

when encrypting, genrand_fourint32(param) is always called internally to generate $p_1$, $p_2$, $p_3$, and $p_4$. On the other hand, with crypt_ . . . _inv(block[], param[])

when decrypting, $p_1$ through $p_4$ are specified for param. This difference is attributable to the fact that the pseudorandom number sequence must be generated in reverse when decrypting. When decrypting, the pseudorandom number sequence is temporarily stored in array temp_rand and used in reverse.

(3-6. Encryption of Text)

When hmnencode(key[], init_value[])
is called, encryption of a text (in FIG. 6, blocks of the plaintext M stored in the memory 620) is performed. key and init_value are arrays and are used together in initialization of MT.

(1) Store a multiplicative constant in multi_table.
(2) A pseudorandom number sequence PN is stored in four-word func_choice[0] through [3], and multiplication and EXOR operation are used to rewrite them into four new words (Later, these four words are cut out three bits at a time, and selection of the above-given 5+3 types of PEF is carried out.)
(3) First, the following three operations are applied to the plaintext.
   crypt_multi (msg[i]);
   crypt_vert_rotate (msg[i]);
   crypt_hori_rightshift (msg[i]);
(4) Afterwards, PEF functions are selected (corresponds to processing by the selector 640 in FIG. 6) using func_choice Iterate times, and transformation is repeated while applying the pseudorandom number sequence PN generated by MT as parameters.
(5) Last, the value resulting from the above operation is subjected again to:
   crypt_multi (msg[i]);
   crypt_vert_rotate(msg[i]); and
   crypt_hori_rightshift(msg[i]);

(3-7. Decryption of Text)

When hmndecode (key[], init_value[])
is called, decryption is performed. key and init_value are arrays and are used together in initialization of MT.

(1) Store a multiplicative constant in multi_table.
(2) Store inverse elements for multiplication thereof in multi_table.
(3) Pseudorandom numbers are stored in four-word func_choice[0] through [3], and multiplication and EXOR operation are used to rewrite them into four new words (Later, these four words are cut out three bits at a time, and selection of the above-given 5+3 types of PEF is carried out.)
(4) (3+Iteration+3) random number blocks to be used later are created and stored in array temp_rand.
(5) The following three inverse transformations are applied to the ciphertext.
   crypt_hori _rightshift inv(msg[i], temp_rand[--k]);
   crypt_vert_rotate_inv(msg[i], temp_rand[--k]); and
   crypt_multi_inv(msg[i], temp_rand[--k]);
(6) Afterwards, PEF functions are selected using func_choice, Iterate times, and inverse transformation is repeated while applying the stored output of MT.
(7) Last, value resulting from the above operation is subjected again to:
   crypt_hori_rightshift_inv(msg[i]), temp_rand[--k]);
   crypt_vert_rotate_inv(msg[i], temp_rand[--k]); and
   crypt_multi_inv(msg[i], temp_rand[--k]);

<4. Fourth Embodiment>

The fourth embodiment is a pseudorandom number generating system, which is characterized in that it transforms a block of a pseudorandom number sequence generated based on a pre-prepared sequence of numbers (shared key) using a function selected based on the pseudorandom number sequence and then generates a secure cryptographic random number sequence. Here, the sequence of numbers is used as parameters for function selection and the selected functions.

A cryptographic random number sequence generated based on a shared key as a sequence of numbers for encrypted data transmission may be used for encryption and decryption of text by a stream cipher.

(4-1. Generation of Pseudorandom Number Sequence)

Pseudorandom number sequences typically used in experiments are generated quickly, however some words can be known by looking at a few words. That is the reason why they are not cryptographically secure. Therefore, an encryption method with a large amount of computation represented by BBS is used for conventional generation of cryptographic random number sequences. This embodiment is a fast pseudorandom number generating system characterized in that it uses key information for function selection, which is the point of the present invention, to rewrite a pseudorandom number sequence into a cryptographic random number sequence with fewer computations, and may constitute a fast, secure stream cipher.

The MT (mt19937ar.c) described in the first embodiment is used here as a generating method for pseudorandom numbers PN. This is because a pseudorandom number sequence having a long period can be generated quickly. Note that another pseudorandom number generating method may be used.

As preprocessing, an initial value for a secret pseudorandom number sequence of 624 words is prepared using a shared key for both encryption and decryption ahead of time. In the case of receiving a session key each time of communication aside from a continuously used, shared secret key, a generated initial value including a part transformed to a session key is used as an initial value for the pseudorandom number sequence used for the communication, and subsequent values to the initial value are used as random numbers.

Pseudorandom number sequence PN is generated successively as needed to output a secure pseudorandom number sequence as given below. Data of the 12n-th word of a pseudorandom number sequence PN is rewritten as follows using from the 12n+1-th word to the 12n+11-th word. Data of the m-th word of the pseudorandom number is represented by R(m).

Given x=R(12n), every two bits of data of R(12n+1) are observed from the most significant bit ten times, and x is changed based on them through the following operation.

If the t-th time two bits are (1) 00, x is changed to the value resulting from modulo operation: $x+R(12n+t+1) \mod 2^{32}$.
(2) 01, x is changed to the value resulting from calculating x EXOR R(12n+t+1).
(3) 10, x is changed to the value resulting from calculating x×R(12n+t+1)*; where, p* is a numeric value resulting from changing the least significant bit of p to 1.
(4) 11, x is changed to the value resulting from executing x shift R(12n+t+1); where s shift is an instruction to shift to the right bits of s by the value of upper significant 5 bits of t, invert bits extending beyond the right end of the word, and write them on the left end.

After changing 10 times, x is output as the n-th word of the cryptographic random number sequence.

Note that the above-given functions (1) through (4) are merely examples, and other operations capable of fast processing may be prepared. Furthermore, a method of increasing the number of times of repeating transformation according to a required security strength and forcibly making use of multiplication and shift operations may be used to increase security. A single word may be obtained by setting number of times of repeating transformation using (m+2) words (where m is a number from 6 to 16) to m times, and determining the first and the m−1-th transformation are conducted through shift operation while the second and the m-th transformation are conducted through multiplication operation, and these processing may be adjusted according to need.

MT can provide complete security in periodicity and enough security in distribution. Since it provides a very long period, period of the generated secure pseudorandom number sequence is also long enough and cannot make use of the entirety thereof. Therefore, it may be continuously used without replacing the shared key.

(4-2. Exemplary Structure of Encryption System and Decryption System Using this Embodiment)

A system configuration of performing encryption and decryption of text (plaintext) by a stream cipher using the pseudorandom number generating system of this embodiment is described forthwith while referencing the system configuration of FIG. 3.

The system of this embodiment is implemented in a terminal such as a typical personal computer, for example. As shown in FIG. 1, an encryption system 110 is implemented in a terminal on the side that encrypts and transmits text while a decryption system 150 is implemented in a terminal on the side that receives and decrypts the text. Furthermore, both the encryption system 110 and the decryption system 150 prepare a sequence of numbers (shared key 122), functions 126, and a pseudorandom number generating system 330 of this embodiment.

With the encryption system 110, first, pseudorandom numbers PN that may not be secure are generated based on the shared key 122 using conventional technology. Next, a function selecting program 334 selects one of the functions 126 to be used to encrypt the PN using the generated PN. In addition, a pseudorandom number generating program 332 uses the PN as a parameter for the function selected by the function selecting program 334 to execute the function and encrypt the PN. As a result, a secure pseudorandom number sequence 325 is generated and temporarily stored in a storage region. Next, as a typical example of a stream cipher, an encryption program 336 encrypts a text 124 by taking exclusive-OR of the pseudorandom number sequence 325 and the text 124 to generate a ciphertext 140.

Meanwhile, even with the decryption system 150, pseudorandom numbers PN that may not be secure are generated based on the shared key 122 using conventional technology. Next, the function selecting program 334 selects one of the functions 126 to be used to encrypt the PN using the generated PN. In addition, the pseudorandom number generating program 332 uses the PN as a parameter for the function selected by the function selecting program 334 to execute the function and encrypt the PN. As a result, a secure pseudorandom number sequence 325 is generated and temporarily stored in a storage region. Next, a decryption program 366 deciphers the ciphertext 140 by taking exclusive-OR of the pseudorandom number sequence 325 and the ciphertext 140 to reconstruct the text 124.

Since the encryption system 110 and the decryption system 150 use the same shared key 122 and functions 126 to generate the same secure pseudorandom number sequence 325, decryption corresponding to the encryption can be performed.

<5. Fifth Embodiment>

The fifth embodiment proposes a method of performing encryption further effectively by adding a 'JUMP process' described later to the systems of above given second through fourth embodiments. Note that an example where the JUMP process is added to the same encryption system and decryption system as the third embodiment is described here; however, functions (PEF) and the like to be used differing from the third embodiment are prepared and described forthwith.

Figure 7:
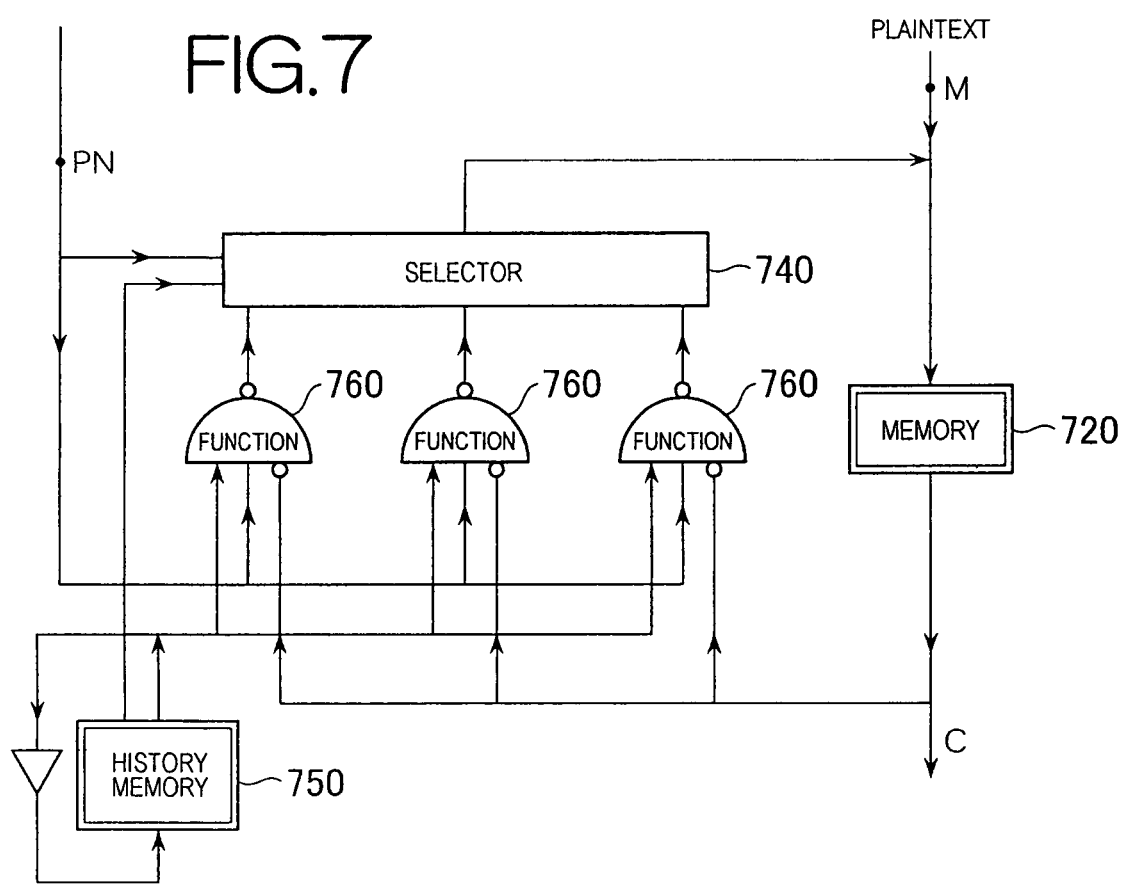
FIG. 7 is a diagram showing processing flow for a pseudorandom number generating system of the fifth embodiment.

FIG. 7 is a diagram showing processing flow for the encryption system of this embodiment.

First, a pseudorandom number sequence is generated through the same method (e.g., MT) as in the above-given second through fourth embodiments, and is used as the pseudorandom number sequence PN to be used in this embodiment (upper left corner of FIG. 7).

Next, the pseudorandom number sequence PN is transmitted to a selector 740 to select one of functions 760. The difference from the second through fourth embodiments shown in FIG. 6 is the addition of history memory 750, which is stored with a step number indicating a step in which block transformation is performed. This computes a value called jump.

jump specifies to each function 'distance to a word to which information of each word is to be given'. When transforming a single block, the value of jump is 1 in the first step, 2 in the second step, 4 in the third step . . . continuing to double in each step, and returns to 1 when reaching t (number of words in a block) or greater. This jump process is conducted by the history memory 750 sending an instruction to the selector 740.

Furthermore, even for function selection in this embodiment, range of function selection changes in each step, such as one of word-wise logical functions PF1 through PF4 (functions computing within a word) is selected in the first step from nine types of functions (PF1 through PF9) used in this embodiment, one of inter-word functions PF5 through PF8 (functions computing across multiple words within a block) is selected in the second step, PF9 is selected in the third step, and one of PF1 through PF4 is selected in the fourth step, . . . . This process is conducted by the history memory 750 sending an instruction to the selector 740. Note that the nine types of functions (PF1 through PF9) used in this embodiment will be described in detail later.

In addition, a selected function 760 receives a parameter approximately the same size as the block size. The pseudorandom number sequence PN generated based on the shared key (sequence of numbers) is used as a parameter for the function as in the second through fourth embodiments.

Effectiveness of the aforementioned jump is described forthwith. Given 1 block is constituted by t words, when performing transformation across multiple words using inter-word functions, in order to quickly send information of a certain word to all other words, a method of sending the information to only next adjacent word is not the most effective method because repetition of t times is required for the information to reach all the other words. To transform quickly, it is better to compute between few words such as two words, and is most effective to double word intervals each time transformation is performed, such as 1 word apart at first (interval of 1), then 2 words apart (interval of 2), 4 words apart (interval of 4), . . . .

Here, denoting two target words with ●, the aforementioned word intervals are as follows:

●● relationship of interval of 1
●○● relationship of interval of 2
●○○○● relationship of interval of 4

In this manner, by representing all natural numbers t by corresponding binary numbers with $\log_2(t)$ orders of magnitude, information may be sent to words at all distances 0, 1, . . . , and t−1 by repeating $\log_2(t)$ times. In other words, the jump process is a process for mixing sufficiently through few repetitions even if it is computation between words (between 2 words in this embodiment) with few inter-word functions.

(5-1. Preconditions and Preprocessing)
(1) W denotes a collection of unsigned integers where 32 bits comprises 1 word.

Here, EXOR, AND, OR, addition, multiplication (modulo $2^{(32)}$) may be performed as binary operations, and right shift, left shift, and bit inversion may be performed as unary operations. These are typically operations included in the instruction set of recent CPUs.

(2) A collection BL of blocks b is defined as $$BL = W^t$$

where t is either 4, 8, or 16.

(3) A collection PARAM of parameters p is defined as $$PARAM = W^t \times \{0, 1, 2, \ldots, \text{and } t/2\}$$

and a collection JUMP of jumping distances j is defined as $$JUMP = \{1, 2, 4, 8, \ldots, \text{and } t/2\}$$

(4) Nine types (PF1, . . . , PF9) of the next function (PEF) are prepared. This corresponds to the function 760 in FIG. 7. Note that details of the nine types of PEF are described later.

$$PF: JUMP \times PARAM \times BL \rightarrow BL.$$

These JUMP, PARAM, and BL respectively correspond to three input lines to the functions 760 of FIG. 7.

Here, an inverse function of PF $$PF': JUMP \times PARAM \times BL \rightarrow BL.$$

is also prepared for decryption; where $$PF'(j, P, PF(J, P, b)) = b$$

must be satisfied, and a function capable of fast computation is desirable.

(5) In this embodiment, the key information (shared key) is sent to MT processing as in the other above-given embodiments. A multiplicative constant table and an additive constant table are created using MT. The multiplicative constant table and the additive constant table are described in detail later.

Note that preconditions and preprocessing other than those given above are the same as described in (3-1. Preprocessing) through (3-3. Global Variables) of the third embodiment, and Iteration (times of transformation) and Log_Tuple (logarithm of the number of words in a block) are determined ahead of time.

(5-2. Encryption of Text)

Next, a plaintext block is encrypted. Here, a case where 1 block is constituted by 4 words and times of transformation is 4 is described. Note that in this embodiment, encryption of text is the same as in the third embodiment apart from the JUMP process.

The provided plaintext block is stored in an array B constituted by t variables, each having a word length:
$B := (b_0, b_1, \ldots, b_{t-1})$ A single round in this embodiment is as follows:
1) Start a round
2) Randomly chose a function from PF1 through PF4 and use it to rewrite B
3) Randomly chose a function from PF5 to PF8 and use it to rewrite B
4) Rewrite B using PF9
5) End round Four rounds of the above steps are carried out to obtain an encrypted block.

More specifically, encryption of a single block is performed in the following manner.

(0) jump←1
(1) Acquire 4-word pseudorandom numbers from MT.
(2) Generate eight sets of 2-bit pseudorandom numbers from these 4 words as $c_1, c_2, c_3, \ldots, c_5$ (generating method is described later)
(3) Select a single PF* from PF1, PF2, PF3, and PF4 in accordance with $c_1 = 0, 1, 2, 3$.
(4) Acquire 4-word pseudorandom numbers from MT and set them as P.
(5) Rewrite B using PF*(jump, P, B). Double jump and set it to 1 when reaching t or greater
(6) Select a single PF* from PF5, PF6, PF7, and PF8 in accordance with $c_2 = 0, 1, 2, 3$.
(7) Acquire 4-word pseudorandom numbers from MT and set them as P.
(8) PF* (jump, P, B) is used to rewrite B. Double jump and set it to 1 when reaching t or greater.
(9) Acquire 4-word pseudorandom numbers from MT and set them as P.
(10) Rewrite B using PF9(jump, P, B). Double jump and set it to 1 when reaching t or greater.

Repeat (3) through (10) four times. $c_3$ and $c_4$ are used instead of $c_1$ and $c_2$ in the second time.

$C_5$ and $c_6$ are used in the third time, and $c_7$ and $c_8$ are used in the fourth time. Note that jump is stored in the history memory 750 in FIG. 7.

Next, the generating method for $c_1$ through $c_8$ in the above-given (2) is described.

The following transformations are performed using the 4 words acquired in (1) as func_choice[0], . . . , function_choice[3].

func_choice[2]*=(func_choice[0]|1);
func_choice[3]*=(func_choice[1]|1);
func_choice[0]^=(func_choice[3]>>5);
func_choice[1]^=(func_choice[2]>>5);

where *= denotes an instruction to multiply the left term by the right term and substitute the resulting value for the left term, ^= denotes an instruction to take exclusive-OR of the left term and the right term and substitute the resulting value for the left term, | denotes OR for each bit, and >>5 denotes a 5-bit right shift. In this manner, the upper significant 2 bits of func_choice[0] become $c_0$, the next two bits become $c_1$, and so on. When the number of rounds is greater than 16, the most significant bit of func_choice[1] is used first.

(5-3. Decryption of Text)

Decryption of text in this embodiment is the same as in the third embodiment apart from the JUMP process.
(1) Obtain initial value of JUMP used in decryption.

This may be obtained through the following expression using Iteration (times of transformation) and Log_Tuple (logarithm of the number of words in a block), which are the two aforementioned constants used for encryption.

$$JUMP = 1 << ((3 * \text{Iteration} - 1) \% \text{Log\_Tuple})$$

where, % denotes an operation to find residue, and 1<< means to double 1 a number of times written on the right side of <<.

(2) Change in JUMP provides inverse processing for encryption.

In other words, when 1 block is constituted by 4 words, the number of words is halved to be 4, 2, and then 1 for each iteration, returning to 4 after 1.

(3) If JUMP is determined in this manner, an inverse function corresponding to the function used at the time of encryption is selected, and this JUMP value and the same parameter used for encryption may be given.

(5-4. Functions to Prepare)

As the functions used in this embodiment, four types of functions PF1, PF2, PF3, and PF4 to transform respective words within a block, mainly inside each word, four types of functions PF5, PF6, PF7, and PF8 to perform transformation so as to mix information between words, and one type as a function, nine types of functions in total are prepared. These nine types of functions are described in order forthwith. Note that these functions PF1 through PF9 are merely examples, and other operations capable of fast processing may be prepared.

(1) PF Through PF4 (Word-wise Logical Functions)

PF1 through PF4 are word-wise logical functions to transform respective words within a block, mainly inside each word. Inverse functions (word-wise logical inverse functions) for reverse-processing to the respective functions are used for decryption.

Each of blocks $b_0, b_1, \ldots, b_{\{t-1\}}$ is constituted by t words while each of parameters $p_0, p_1, \ldots, p_{\{t-1\}}$ is also constituted by t words. First, substitution:

$$b_j \leftarrow b_j \text{ EXOR } p_j$$

is performed (where $j=0, 1, 1, \ldots, t-1$). Next, multiplication by an odd constant:

$$b_j \leftarrow b_j \times c_j \pmod{2^{\{32\}}}; \text{ mod is always present but is omitted forthwith}) \text{ (where } j=0, 1, \ldots, t-1) \text{ is performed.}$$

$c_j$ is selected through the following method using tables of odd random numbers $m_0, m_1, \ldots, m_{\{31\}}$ generated by MT ahead of time. The least significant bit of each of $m_0, m_1, \ldots,$ and $m_{\{31\}}$ is set to 1 so that they are all odd numbers. Furthermore, $c_j := m_{\{kj\}}$, where $k_j$ is the integer value of upper significant 5 bits of $p_{\{j+ell\}}$ ranging from 0 to 31; and the value of ell is 1, 2, 2, and 3 for PF1, PF2, PF3, and PF4, respectively. Note that the tables are prepared because the inverse (modulo $2^{\{32\}}$) of $c_j$ is used for decryption.

In this embodiment, this multiplicative constant tables $m_0, \ldots, m_{\{31\}}$ are generated by MT as preprocessing for encryption, and multiplicative inverse constant tables based on modulo $2^{\{32\}}$ are generated and stored. Moreover, additive constant tables $add_0, \ldots,$ and $add_{\{31\}}$ are also generated by MT and stored.

Next, substitution:

$$b_{\{(j+jump) \bmod t\}} \leftarrow b_{\{(j+jump) \bmod t\}} \square add_{\{[bj>>(32-5)]\}}$$

is performed. This is computed for $j=0, 1, 2, \ldots,$ and $t-1$ in this order. This means that upper significant 5 bits of $b_j$ are viewed, corresponding add-table's value (corresponding additive constant table's value) and value of $b_{\{j+jump\}}$ (this subscript should be viewed based on modulo t) are subjected to a binary operation $\square$, and the resulting value is stored in $b_{\{j+jump\}}$. The binary operation $\square$ is $+$ for PF1, EXOR for PF2, $+$ for PF3, or EXOR for PF4.

Next, pseudorandom number $s_j$ taking a value ranging between 16 and 23 is generated in the following manner.

$$s_j((p_j>>(32-4)|0\times10) \& 0\times17;$$

where & denotes AND operation for each bit.

One of the following two transformations is performed for $b_j$ using $s_j$.

$$b_j \leftarrow ((\sim b_j) << (32-s_j)) | (b_j >> s_j).$$

$$b_j \leftarrow b_j \text{EXOR} ((\sim \text{sim} b_j) >> s_j).$$

The former is a rotation (Note that bit inversion or $\sim$ is executed for a part extending beyond the left end of the word). The latter conducts bit inversion, shifts to the right by the value of $s_j$, and appends the resulting bits to $b_j$ (called shift). PF1, PF2, PF3, and PF4 select rotation, rotation, shift, and shift, respectively.

(2) PF5 Through PF8 (Inter-word Functions)

PF5 through PF8 are inter-word functions, each performing transformation to mix information mainly between words (between 2 words in this embodiment). Inverse functions (inter-word inverse functions) conducting reverse operations to processing of the above-mentioned respective functions are used for decryption.

1) PF5

First, given $j=0$, $$b_j \leftarrow b_j + (b_{\{j-jump\}} \times p_j)$$

is computed.

Using $s_j \leftarrow ((p_j >> (32-4)|0 \times 10) \& 0 \times 17$
pseudorandom numbers taking values ranging between 16 and 23 are generated, and $$b_j \leftarrow b_j \text{EXOR} ((\sim \text{sim} b_j) >> s_j).$$

is computed. This is repeated for $j=0, 1, 2, \ldots,$ and $t-1$ in this order.

2) PF6 through PF8

$j=0$.

Using $s \leftarrow (p_j >> (32 - \log_2(t)))$
upper significant $\log_2(t)$ bits of $p_j$ are stored in s. When $s=j$, 1 is subtracted from s (this computation is conducted based on modulo t). This makes s be different from j. Here, with PF6, substitution:

$$b_j \leftarrow (b_j \text{EXOR} (b_{\{j-jump\}} \times b_s)) - p_j$$

$$b_j \leftarrow b_j \text{EXOR} (b_j >> 16)$$

is performed. The subscripts are based on modulo t.
With PF7 and PF8, substitution:

$$b_j \leftarrow (b_j \text{EXOR} (b_{\{j-jump\}} \times b_s \square - p_j));$$

$$b_j \leftarrow b_j \text{EXOR} (b_j >> c);$$

is performed. Here, $\square$ denotes OR for each bit when PF7, and EXOR when PF8. Furthermore, c is 16 when PF7, and 17 when PF8.

(3) PF9

Calculation: $k=2(p_0+p_{\{t-1\}})+1 \bmod 2^{(32)}$ is performed. jump_odd is the largest odd number below jump. In blocks $b_0, b_1, \ldots, b_{\{t-1\}}$, cyclic replacement for a place corresponding to the bit of k being 1 is performed while skipping by jump_odd.

Namely, the following replacement is performed.

1) Extract and store a bit of $b_0$ corresponding to the bit of k being 1. This is equivalent to storing the resulting value of the AND operation conducted for each bit of $b_0$ and corresponding bit of k.
2) Next, replace the above-given bit of $b_0$ with corresponding bit of $b_{(-jump\_odd)}$, where the subscript of b is computed based on modulo t.
3) Replace the corresponding bit of $b_{(-jump\_odd)}$ with corresponding bit of $b_{(-2jump\_odd)}$. In this manner, chain-operation such as repetition of replacing corresponding bit of $b_{\{-j; jump\_odd\}}$ with corresponding bit of $b_{\{-(j+1); jump\_odd\}}$ is conducted for $j=0, 1, \ldots,$ and $t-1$.
4) Last, replace corresponding bit of $b_{\{-(t+1); jump\_odd\}}$ with the stored corresponding bit of $b_0$.

Inverse functions conducting inverse operations to the above-given processing are used for decryption.

<6. Sixth Embodiment>

The sixth embodiment is a method using a cryptographically secure pseudorandom number sequence SPN generated based on a pre-prepared sequence of numbers (shared key) by the above given crpytMT (first embodiment) as the pseudorandom number sequence PN to be used for the respective second through fifth embodiments. With this method, use of cryptographically secure pseudorandom numbers for selection of a function to be used for encryption and parameters for the function makes it difficult to decipher.

The invention claimed is:

1. A pseudorandom number generating apparatus, which outputs a cryptographically secure pseudorandom number sequence generated based on a sequence of numbers prepared ahead of time, the pseudorandom number generating apparatus comprising:
    a hardware processor configured to execute a pseudorandom number generating program, the pseudorandom number generating program instructing the hardware processor to execute:
    a step (a) of creating an accum by setting a word to an initial value,
    a step (b) of storing the accum in hardware memory,
    a step (c) of generating a pseudorandom number sequence based on the sequence of numbers,
    a step (d) of creating an extracted word by extracting a number of bits from the pseudorandom number sequence,
    a step (e) of creating a cut out word by setting the least significant bit in the extracted word to a value of 1,
    a step (f) of executing a formula to create a new accum, the formula being:

$$\text{the new accum} = \{\text{the accum} \times \text{the cut out word}\} \mod 2^{(a\ length\ of\ the\ extracted\ word)},$$

a step (g) of replacing the value of the accum stored in the hardware memory with the value of the new accum,
    a step (h) of retrieving the new accum from the hardware memory,
    a step (i) of creating a secure pseudorandom number sequence, the secure pseudorandom number sequence by extracting some or all bits of the new accum,
    a step (j) of outputting the secure pseudorandom number sequence,
    wherein the pseudorandom number generating program instructs the hardware processor to repeat the steps (c)-(j).

2. The pseudorandom number generating apparatus according to claim 1, wherein the secure pseudorandom number sequence is used to encrypt a plaintext message into a ciphertext.

3. The pseudorandom number generating apparatus according to claim 1, wherein the secure pseudorandom number sequence is used to decrypt a plaintext message from a ciphertext.

4. The pseudorandom number generating apparatus according to claim 1, wherein the initial value is 1.

5. The pseudorandom number generating apparatus according to claim 1, wherein the number of bits is 32.

6. A tangible non-transitory computer-readable storage medium having the pseudorandom number generating program stored therein,
    wherein the pseudorandom number generating program configures a computer to perform as the hardware processor of claim 1.

* * * * *